April 5, 1966 I. M. DILLER 3,244,604
METHOD AND APPARATUS FOR THE ACTIVATION
OF A MELT OF A FUSED SALT
Filed Dec. 3, 1962 7 Sheets-Sheet 1
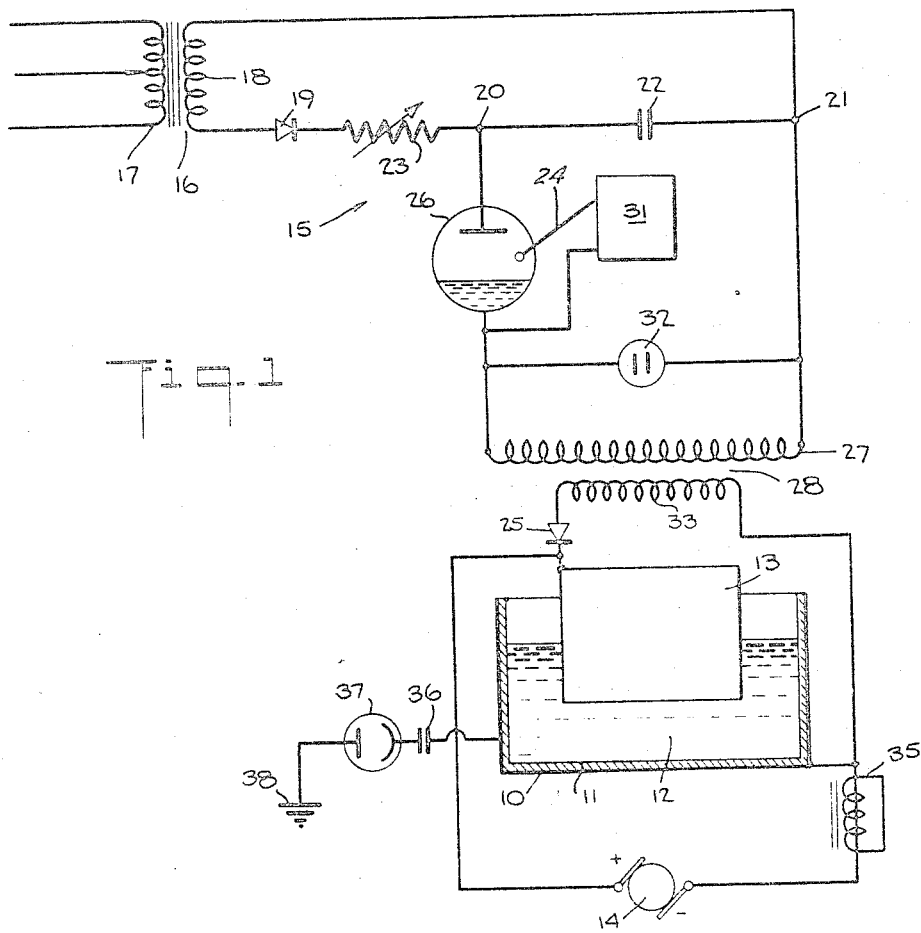
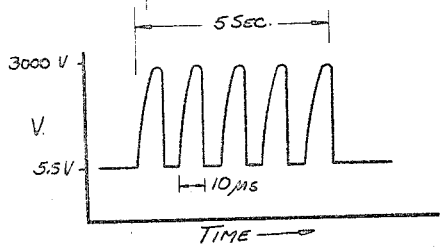
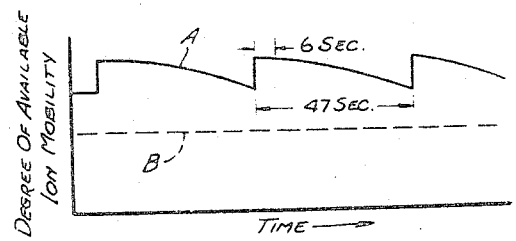
INVENTOR.
ISAAC M. DILLER
BY
Kenyon & Kenyon
ATTORNEYS April 5, 1966  I. M. DILLER  3,244,604
METHOD AND APPARATUS FOR THE ACTIVATION
OF A MELT OF A FUSED SALT
Filed Dec. 3, 1962  7 Sheets-Sheet 2
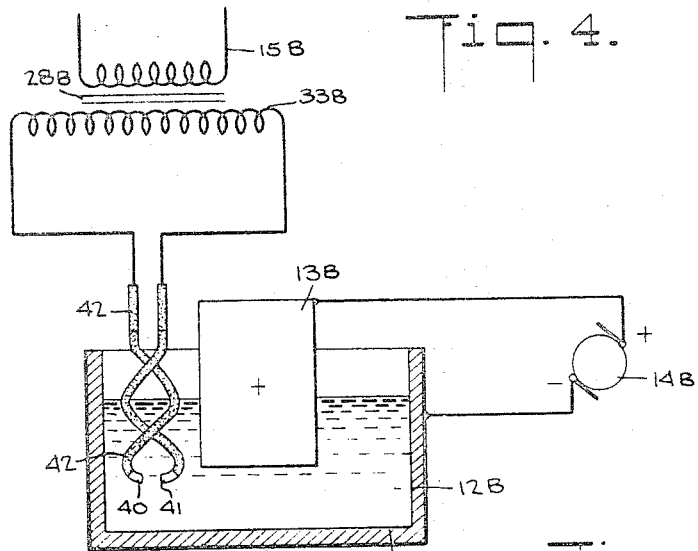
Fig. 4.
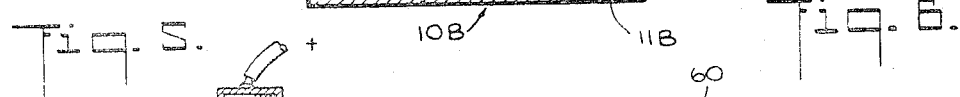
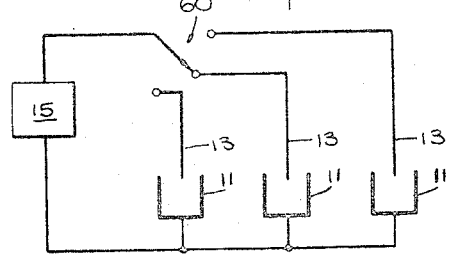
Fig. 6.
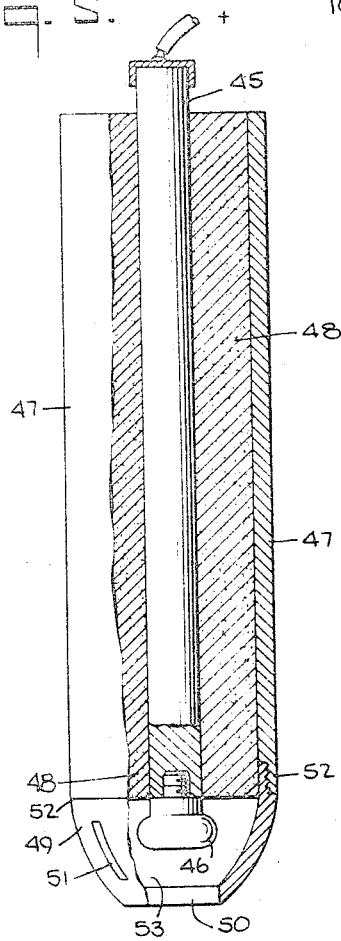
Fig. 5.
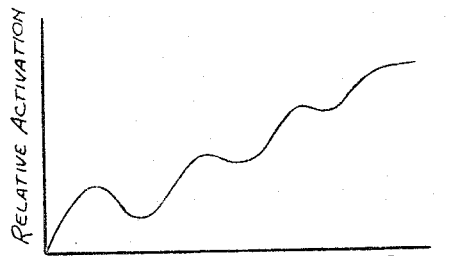
Fig. 10.
VOLTAGE, POWER, SHAPE AND SERIES
QUANTITY OF IMPULSES
INVENTOR.
ISAAC M. DILLER
BY
Kenyon & Kenyon
ATTORNEYS

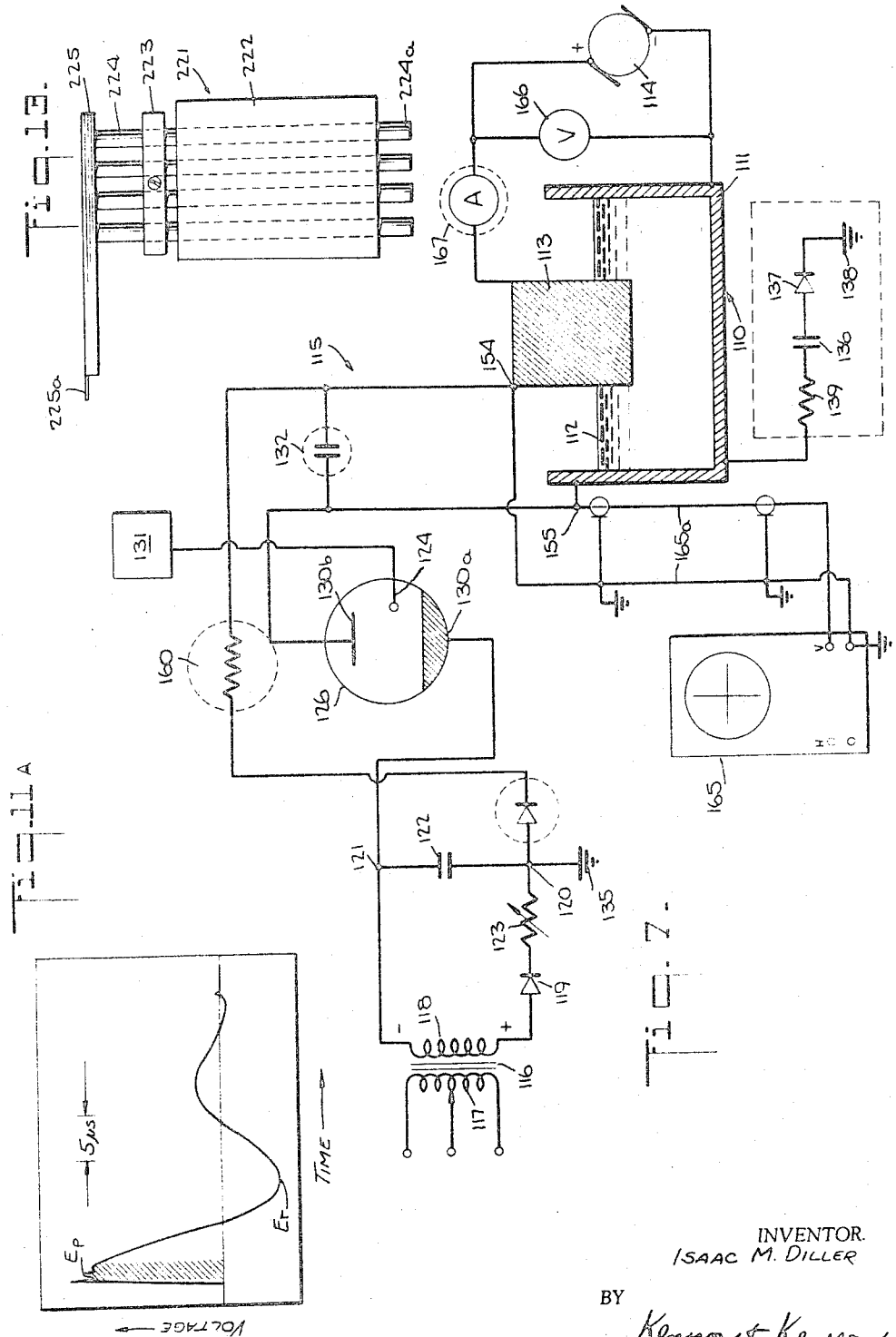

April 5, 1966  I. M. DILLER  3,244,604
METHOD AND APPARATUS FOR THE ACTIVATION
OF A MELT OF A FUSED SALT
Filed Dec. 3, 1962  7 Sheets-Sheet 4
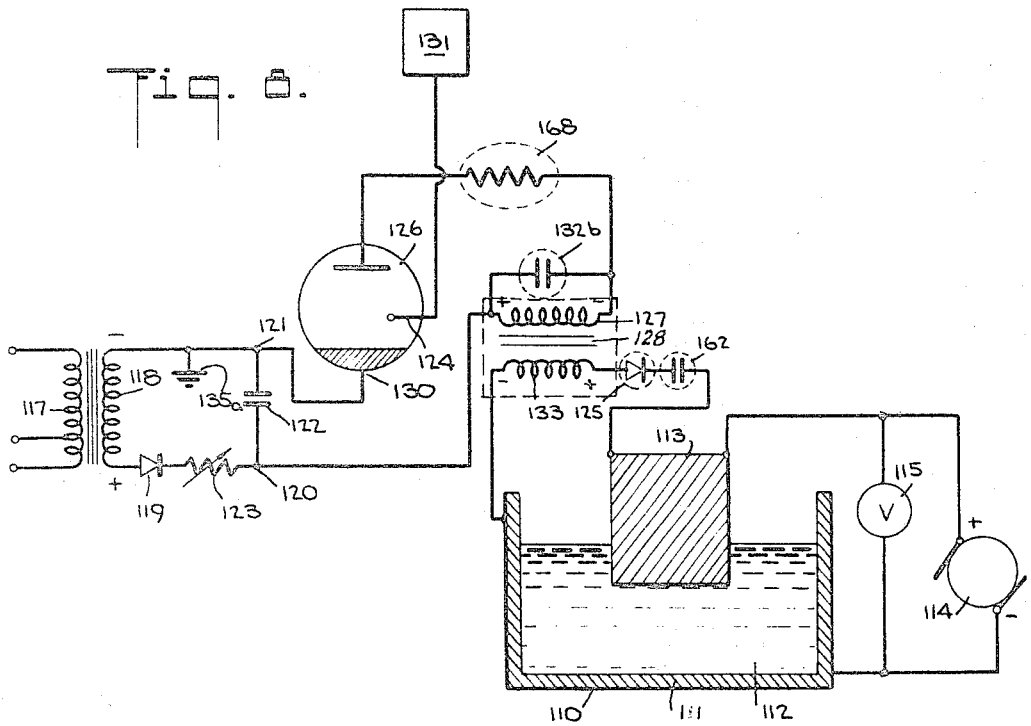
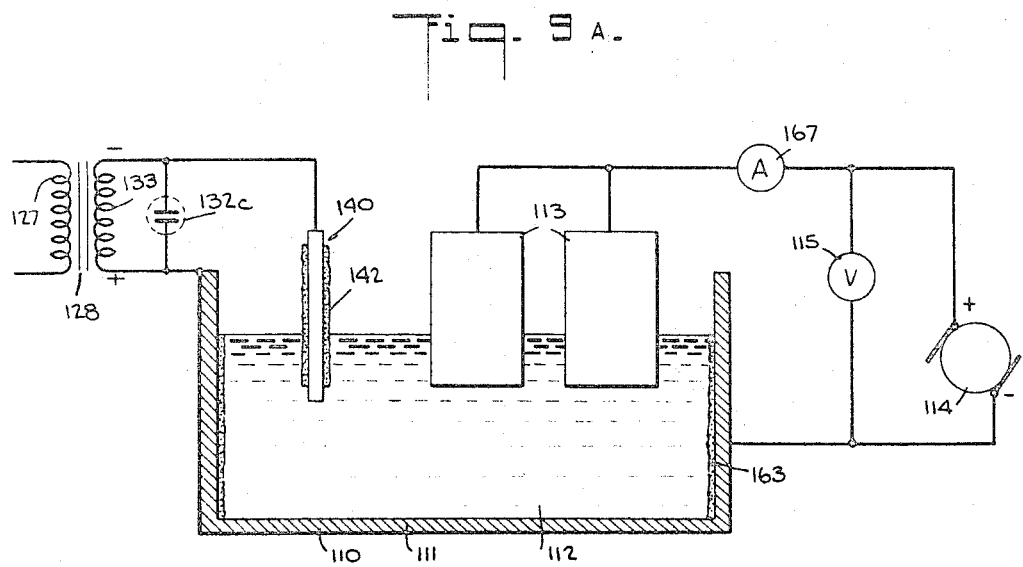
INVENTOR.
ISAAC M. DILLER
BY
Kenyon & Kenyon
ATTORNEYS INVENTOR.
ISAAC M. DILLER
BY
Kenyon & Kenyon
ATTORNEYS

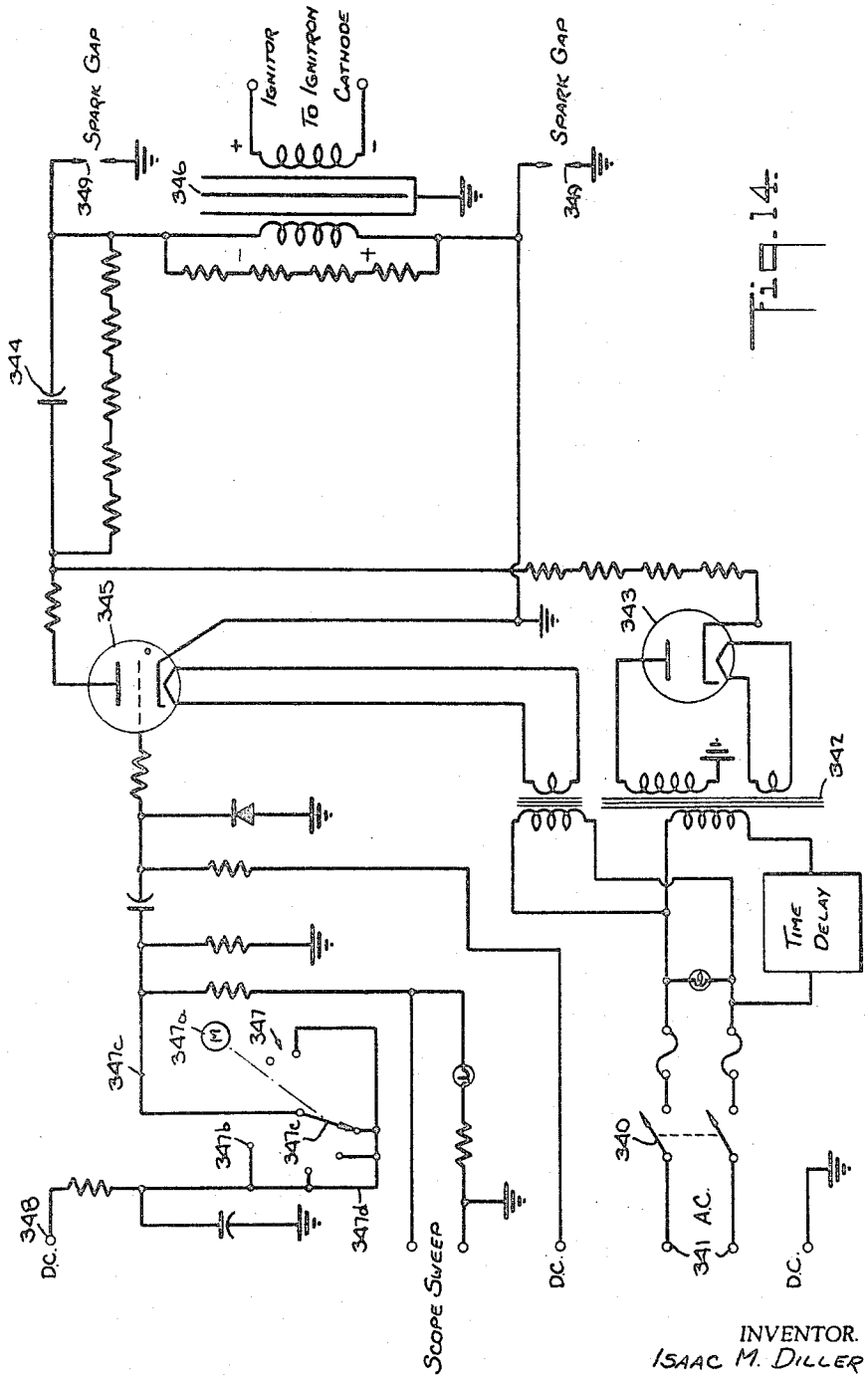

INVENTOR.
ISAAC M. DILLER
BY
Kenyon & Kenyon
ATTORNEYS

United States Patent Office 3,244,604
Patented Apr. 5, 1966

3,244,604
METHOD AND APPARATUS FOR THE ACTIVATION OF A MELT OF A FUSED SALT
Isaac M. Diller, 38 Otter Pond Trail, Westport, Conn.
Filed Dec. 3, 1962, Ser. No. 241,895
83 Claims. (Cl. 204—67)

This application is a continuation-in-part of U.S. application Serial No. 187,878, filed April 16, 1962 (now abandoned); U.S. application Serial No. 112,729, filed May 25, 1961 (now abandoned); U.S. application Serial No. 829,433, filed July 24, 1959 (now abandoned); U.S. application Serial No. 697,132, filed November 18, 1957 (now abandoned); U.S. application Serial No. 570,944, filed March 12, 1956 (now abandoned); and U.S. application Serial No. 305,299, filed August 19, 1952 (now abandoned).

This invention relates to the improving of the efficiency of a fused salt electrolytic cell by increasing its conductivity and more particularly to the improving of the efficiency of the Hall process for electro-winning aluminum.

The Hall process electrolyzes a solution of alumina in various mixtures of cryolite and other compounds such as Ca, Mg, Li and Na halides, and still other additives. Cryolite from the natural mineral or the so-called synthetic cryolite is satisfactory so long as it functions for the Hall process. In accordance with the Hall process, the salt is raised to its melting point, generally 900° C. to 1000° C., and alumina is dissolved therein in amounts ranging from about 2% to about 20% but more generally about 8%. A D.C. current, hitherto generally between 4.5 volts and 5.5 volts, is passed through the molten mixture. The anode is generally a baked preparation of cemented carbon in one or more segments which enter the salt bath vertically. The container, or pot as it is called in the industry, comprises or contains the cathode. After bath saturation, the aluminum which is formed in the process precipitates to the bottom from which it is partially removed from time to time. Some is left at the bottom at the time of removal to serve as a cathode surface.

The Hall process has been used for many years by the industry and although certain minor improvements have been made to obtain somewhat better operating efficiency and improved purity of product, the thermodynamic or electrochemical efficiency has remained at the undesirably low level of about thirty-three percent and consequently the amount of electrical power consumed within the cryolite-alumina bath is about three times the theoretical electrochemical requirement. The enormous economic gain to be had by any appreciable increase in efficiency can be appreciated when it is realized that the amount of electric power consumed in the production of aluminum by our present economy represents a substantial portion of all the electric power generated in the entire world.

Much has been done over the years in attempts to improve the voltage efficiency. Various additives to the bath have resulted in small gains. Some additives are illusory in that the added current is electronic rather than ionic or, in any event, non-productive of the metal. With some additives, the effect may be shortlived and not repeatable. Some improvements require repetition on a continuous basis so that the cost of the improvement is a large, if not overwhelming, portion of the gain. Yet the thermodynamic efficiency has been recognized to be only one-third of the theoretical. The thermodynamic contribution of the carbon anode should also be considered and when this is done, thermodynamic efficiency of the Hall process is even much less than one-third.

Other improvement work in the industry has been focused upon inter-electrode distances, electrode shapes and materials, and means for conducting electrical current to the pot or cell. Additional improvement work has also been directed to the counteracting of the abnormal condition known as anode effect.

It is an object of the present invention to increase the thermodynamic and electrochemical efficiency of a fused salt electrolytic process.

More specifically, it is an object of the invention to increase the efficiency of the Hall process.

It is still another object of the invention to transpose the melt of a fused salt electrolytic cell into an activated state in which there is a higher level of efficiency.

It is an additional object of the invention to increase the electrical conductivity of a fused salt electrolytic cell in order to maintain a given operating rate with a reduced consumption of electrical energy.

It is a further object of the invention to increase the operating rate of a fused salt electrolytic cell above its conventional operating rate while maintaining the same level of consumption of electrical energy as that of the conventional operating rate.

It is a further object of the invention to operate a fused salt electrolytic cell, such as a cryolite-alumina cell, in a manner such as to obtain a combination of faster operating rate and higher yield of metal per unit of overall electrical power consumption.

As an aid in reading the specification, the definition of various terms employed therein are set forth below:

*Cryolite mixture.*—A mixture used in the aluminum industry for dissolving alumina which is capable of supplying catalytic reactions required so that an electrolyzing current results in the separation of aluminum from the dissolved alumina. Such a mixture generally contains mined or equivalent sodium aluminum fluoride and is generally mixed with other compounds usually alkali fluorides or alkaline earth fluorides for lowering operating temperatures and surface tension. It may contain other salts such as sodium chloride for economy or otherwise. The requirement of "cryolite mixture," such as term is used herein, is that it dissolves alumina and that it be electrolyzable with substantial current efficiency with a low voltage so that aluminum precipitates and collects at the bottom of the melt. Thus as used herein, "cryolite mixture" and "cryolite-alumina" refers to material suitable for industrial use for the Hall process, the alumina being present in sufficient amount to permit reduction at less than 7 volts.

*Conductivity.*—This is the inverse of the resistance and therefore the inverse function of the voltage required to drive the electrolyzing current, particularly the electrolyzing current which results in the production of aluminum. Thus, conductivity as used herein would not refer to an electronic conductivity or to ionic conductivity of a side reaction. Part of the conductivity improvement herein results from better anode depolarization and lower back E.M.F. Conductivity herein is overall cell conductivity.

*High energy discharges.*—This is an impulse of electrical energy the initial peak voltage of which lies in the range between about 1000 volts and about 5000 volts measured at the firing electrodes and not at the source. It is one in which the current, during the first few micro-seconds following the voltage peak, does not lag behind the voltage by more than about 45 degrees. Such a discharge, depending upon the size of the firing anode, requires billions of watts during the short period of peak activity. The region of peak activity is shown shaded in FIGURES 11A and 11B.

*Activated cryolite.*—This is a cryolite mixture which has been successfully subjected to the high energy electrical discharges in accordance with the invention. The cell is now distinguished by showing a greater overall conductivity. It also is capable of dissolving more aluminum than the unactivated cell, and it also shows a lower back E.M.F. for the low voltage anode. The high energy discharges may be used indirectly as my mixing, in the molten state, an activated cryolite with an unactivated cryolite, provided only the activated material is not so diluted or chilled as to quench the chain reaction. The additional dissolved aluminum may be dispersed colloidally or as atoms or ions in the molecule or in the lattice structure of the residual unit crystals. Some residual properties of the activated cryolite may remain even after chilling depending partly on the thermal history of chilling, that is that it still incorporates more aluminum and more aluminum oxide within its molecule, and in any event upon remelting causes the cell to have a lower conductivity probably due to better wetting of the anode. The voltage value gain resulting from the latter is about 20% of the overall gain.

*Activation level.*—This refers to the extent to which the overall conductivity improvement has been carried out. It is a level or plateau of conductivity from which further improvement with time does not take place spontaneously in a substantial quantity. Further impulses are required for going from a given level to a higher level. There is a saturation level beyond which no further long term improvement can take place. The pulsing is preferably predetermined, so that the highest activation level can be reached eventually, but the pulsing is completed before any lower plateau has set in. Going from a lower plateau to a higher plateau requires matching to a much lower resistance without corresponding increase in anode area and, consequently, without a corresponding increase in the capacitance of the source. It is also seen from FIGURE 10, that the activation level is not continuously consistent with the impulse energy and shape.

*Chain reaction.*—The process which once begun by the high energy input, proceeds to build up to an activation level and to spread nucleation centers through the entire cell. Once established it maintains its ultimate plateau for a period which is very substantial relative to the duration of the pulsing series. The release of ions maintains pace with the attenuation processes.

*Unidirection.*—This term refers to the maintenance of a single direction by the high tension impulses for the entire period at issue. For the long term effects produced herein, the unidirection refers to the first quarter cycle of a damped wave. If a wave of any other shape is used, the unidirection refers to the maintenance of a single direction until the effect is initiated. It is the direction before the first reversal, if any.

*Concentration gradient.*—This is the initial exciton gradient under the firing anode. It is built up and temporarily held in place by the magnetic field which accompanies the impulse. It consists of a mass of phonons, vacancies, dislocations, excitons, conduction electrons, implanted aluminum atoms or ions, etc. It is a concentrated mass of activity capable of going out into the cell at large and inducing a chain reaction. The result is improved conductivity. The initial gradient must have sufficient concentration for this purpose so that it is not immediately diluted by the surrounding inactive material to the point where absorption exceeds the rate of formation of new activity by the chain reaction for it may quench. Neither is it to be held in place for an excessive period by mechanical or electrical restriction to flow for it may burn out. Thus, the concentration gradient therefore includes not only intensity but volume of initial excitons. The volume is related to the quantity of material to be activated. Preferably, the volume encompasses a short gap. Concentration gradient may be furthed defined as an initial quantity of activity capable of initiating a chain reaction of activation and of doing so faster than such chain can be attenuated.

*Gap.*—The distance between the firing anode and the firing cathode. The cathode usually is also the low voltage cathode although it may be a special cathode. The firing anode is usually a special anode but it may be all or part of the low voltage anode system.

*Voltage.*—The voltage at an electrode of the bath when such voltage is driving current. Pulse voltage does not include overshoot which may occur during the first nanosecond of a pulse. Peak pulse voltage is the peak voltage held for a duration such as one microsecond or more. The effectve pulse voltage includes more than the peak, but not the portion below the voltage range although such portion may be needed for follow-through.

*Available ion.*—Ions, crystal vacancies and defects, usably operative at field voltages of 3 to 7 volts. An ion or the like is not useful to the electrolyzing process unless it is an "available ion." A primary feature of this invention is the increased ratio of available ions to total ions.

*Impulse polarity.*—The polarity of the highest peak of an impulse is its polarity.

*Follow-through.*—Follow-through as shown in FIGURE 11A is in the region between the shaded portion and the point of crossing the zero axis.

*Cell.*—A cell consists of a container in which there is disposed a melt and which is provided with a cathode connection and an anode system.

*Melt.*—Melt refers to a molten fused salt such as a fused salt solution of an oxide and more particularly of the cryolite-alumina type.

*Anode area.*—The computation of anode area is primarily the projection of the lower surface of the anode to the cathode. The anode sides also contribute in a vectorial sense to this projection. Anode area therefore will vary with the particular geometry. In general it is the area plus the order of about 20%. When anode area is given in the examples herein, the side current plays a greater part due to the experimental conditions of a pilot operation. The anode area herein given are total anode area.

*Reversal.*—Reversal, that is to say percentage reversal is the percentage of the voltage peak of the first reversal to the first voltage peak of the impulse. Polarity designation whether or not in itself significant is the polarity of the first peak. In FIGURE 11A, $E_p$ and $E_r$ designate the peak voltages of the forward and reversal currents, respectively. Reversal is the unhampered reversal or the tendency to reversal. A correction of the inductance of the leads, for example, by a small capacitance such as each or all of the capacitors 132, 132c, 132b, or 162 would have a true effect on the reversal image. On the other hand, a cut-off of the reversal, such as caused by transformer saturation, rectifier 161, or rectifier 25, or a crowbar shorting would distort the image and conceal the reversal without, however, altering the power factor of which the reversal is an indication. In the case of Crystal Effect, we are concerned with reversal as indicating the true power of the first-quarter cycle of the impulse shown shaded in FIGURE 11A. In the case of Mobility Effect, in addition to the impulse power the reversal also has a directional significance.

The process of the invention utilizes short infrequent high energy electrical impulses, more particularly described below, which are applied to the fused salt electrolytic bath in order to activate the melt therein. A single impulse or a series of impulses in accordance with the invention produces a lasting effect. The use of the present additional impulses in accordance with the invention can be applied whenever the activation of the cell becomes attenuated or terminated after a period of time or upon severe pot cooling.

Herein are described my procedures for altering the overall and useful conductivity for enduring periods by a short series of brief impulses. In accordance with the process of the invention, the impulses are in a range of peak voltage (at the electrodes) a range of repetition rate, a range of duration in one direction before any reversal, a range of rise time, a range of lag between impulse current and voltage, and within a range of relationship between the firing anode area and the size and geometry of the pot.

Conductive enhancement or activation varies in quantity and duration with the degree of approach to an optimum condition being dependent upon how effectively the process of the invention has been carried out. The duration may last minutes, hours or days. The result of the process is that current ordinarily accompanying 5.0 volts at the electrodes is now maintained by from about 1.9 volts to about 4 volts across the electrodes. There appear to be several distinct activation levels which will be described herein.

The activation effect continues regardless of the addition of fresh alumina, the addition of fresh bath material, or upon change of anodes. Upon consuming the alumina, the pot enters the usual anode effect, but upon the addition of fresh alumina the conductivity to the previously activated level is restored. The activation can possibly be destroyed by chilling the bath, however, a chilled bath can be remelted and reactivated. When the activation anneals, it can be restored by additional impulses. The activation is not extinguished even by the addition of large quantities of fresh cryolite, but rather the activation chain extends into the new material. If done in sufficient proportion to prevent excess dilution, activated material can be poured into an unactivated bath for the purpose of activating the whole.

It appears that activation occurs when a properly executed impulse or group of impulses results in the build-up of a concentration gradient of excitons which is then free to move easily into the melt at large. These are reinforced by the excitons which bounce back and by the chain production of additional excitons beyond those lost at the walls or by absorption. The gradient is briefly held in place by the peak magnetic field produced by the impulse. The excitons travel at enormous speeds. The magnetic field is now attenuated and the balance of the impulse causes the concentration gradient to move out into the melt at acoustical speeds. As it moves out, it sets up new centers of activity and it makes itself felt by temporarily increasing current or lowering voltage at the regular low voltage anodes. Then the chain reaction, the nuclei of which are by now well dispersed through the bath, continues to build up, reaching a near final plateau after a period of time such as about 15 minutes. When fresh alumina or salt materials are added, they too enter the chain reaction unless the added materials have a quantity sufficient to absorb activation centers faster than the chain reaction can supply them. The impulses may be applied through the regular low voltage anode or through a special anode being placed to permit the same unrestricted flow of the melt. The low electrolyzing voltage may be on or off during the pulsing.

In one embodiment of the invention, at least one high voltage and high energy impulse having a peak value in a range of about 1000 volts and about 5000 volts, measured at the electrodes as opposed to the source, and having other characteristics to be described, is fired from the low D.C. voltage anode either with or without the passage of low voltage current. When a series of impulses are employed, each impulse follows the preceding impulse after a predetermined interval, such as about 15 seconds. A series of from one to 20 pulses or more are fired within a period of several seconds to several minutes. Ordinary electrical meters indicate, after a period of seconds to several minutes, the extent of activation which has been accomplished. The activation then proceeds and within about 15 minutes, more than 90% of the activation has been achieved. The activation level provides the advantage of lowering the pot voltage for the same current, operation at a higher rate with the same power, or some of each advantage. The new state continues for a period of from minutes to days, depending upon how well the activation procedure has been carried out and the activation level which has been reached. Later the pot may be pulsed again as required.

In another embodiment of the invention the high voltage impulses, herein described, are fired from a special anode which is smaller in area than the ordinary anode, thereby enabling an economy of equipment and, possibly the attainment of superior results. Such auxiliary anodes may be specially adapted for applying impulses and used only for firing or they may be one of the several anodes used in the regular electrolytic reduction.

Each of the embodiments of the invention results in a higher conductivity. That is, in the subsequent electrolytic reduction the current for a given voltage is higher, or the voltage for a given current is lower. The current drawn under the new conductivity resulting from activation has been experimentally proved to be at least as effective in terms of production of aluminum as is the ordinary current of the same given magnitude before activation, that is, the current efficiency is at least mainmainted. However, the very large improvement of this invention can be limited by an excessive voltage drop in the connection from the bus bar to the carbon anode. As a result of the present improvement it becomes even more desirable therefore to minimize connection losses. In any event, I point this out so that this limitation will be recognized in evaluating test results.

This invention not only enables a decrease to be made in the overall cell voltage for the electrolytic production of aluminum, but the invention also enables the anode to carry a higher current without the usual corresponding loss of efficiency. Moreover, at the higher production rates, less anode material is consumed per pound of aluminum smelted. In view of the economy in anode material, there is less impurity per pound of aluminum from the anode ash.

In still another embodiment of the invention a melt of a fused salt solution of an oxide is activated separately from the electrolytic cell to which the melt is to be delivered. Thus upon delivery of the activated melt to the cell, the conductivity of the cell is increased. With this arrangement the melt to be employed in a plurality of electrolytic cells can be activated at a single location, thereby obviating the need of either activation equipment at each cell or the need of portable activation equipment adapted to be operated adjacent each cell. Such an arrangement can also be employed in reactivating the melt in each of the plurality of the cells upon the transfer of the melt from each cell back to the activation equipment.

It is believed that the high energy impulses set off a chain reaction which is supported by the heat of the bath. It is believed that this reaction results in increasing dissociation of the ions and in the production of new ions. It breaks down residual unit crystals in the melt. It increases the vacancy content of the unit crystals. It also appears to influence the wetting of the anodes by supplying more favorable ionic constituents. The back E.M.F. is therefore lower after activation.

The percentage of dissolved aluminum is increased, and it is believed that this additional dissolved aluminum is an effective agent in further catalyzing the reactions characteristic of the Hall process. It is further believed that this additional dissolved aluminum is an effective agent in reducing the voltage between the anode and the bath and in increasing the current efficiency, and thus further increasing the improvement of the invention. Current efficiency in excess of 95% has been observed as against an industry standard of 85%. Upon quickly chilling the cryolite which has been activated, it is of a substantially deeper gray color than similarly chilled cryolite which has not been activated. The dissolved aluminum is apparently not separable by physical means since attempts to accomplish this by grinding to an impalpable powder and then subjecting the powder to a combination of magnetic and vibrational forces, as well as density separation techniques were unsuccessful.

Thus it is seen that I have obtained a combination of greater ionic availability and greater depolarization at the anode and by the anode. Most important of all, this invention effects the creation of a self-sustaining chain reaction of a duration so substantial that the amount of energy and equipment used for producing the impulses is negligible in comparison with the saving in energy resulting therefrom. Moreover the repetition rate in any series of impulses is so low that the required peak power which is in billions of watts is supplied by feasible means and at low steady power demand.

The object of the impulses may be likened to the setting up of an initial concentration gradient of excitons capable, firstly, of going out into the bath and setting up nucleation centers for the chain reaction, and, secondly, to provide a sufficient concentration of excitons so that the absorption by the bath and the attenuation at the walls does not exceed the chain production of further excitons to the point where the chain is quenched. To thus form a suitable concentration gradient in relation to the size of the bath and its geometry, it is necessary to produce an ample quantity and it is necessary to do so above a certain energy threshold. It is also necessary that the amount of energy which is thrown into the concentration gradient is not unduly prolonged or too rapidly repeated, as the concentration gradient would then be destroyed, possibly due to local overheating or an excessive disruptive force. It is also necessary that the gradient, once released by the collapse of the high intensity magnetic field, be unobstructed so that the resultant shock-front is free to propagate from the immediate vicinity of the anode.

I have found that the voltage threshold for satisfactory impulses is in the range from about 1000 volts as an approximate lower limit and to about 5000 volts as an approximate upper limit. Since the upper limit is essentially a dielectric breakdown limit, it is agreeable to exceed 5000 volts if the breakdown strength of the dielectric of the bath is not exceeded. On the other hand, the additional energy of the excitons can also be countered by the burn-out force of the additional voltage.

In some combinations of voltage, firing anode area, storage capacitance, etc., the advantages and disadvantages of an excessive total impulse energy tend to neutralize each other so that 4000 volts may be no more effective than 2000 volts or 2500 volts. In such cases, I usually decrease the capacitor size and fire at about 4000 volts peak measured at the electrodes.

I have discovered that the impulse also is effective in producing the concentration gradient to the extent that its voltage is in phase with its current. Thus, while there is a voltage threshold, there is also a requirement in terms of real energy during the significant portion of the impulse period. However, a power factor of unity is not desirable as the impulse would be excessively prolonged. Moreover, it would lack the benefit of the energy magnetically stored in the leads and transformer coils and this energy is valuable in the follow through.

I have further discovered that it is desirable that the high energy level of voltage and current be attained quickly. Thus a rapidly rising magnetic field can contain the gradient until it is built up to a point where it can nucleate the chain. On the other hand a slow rise can overheat and disperse the crystals, atoms, ions and excitons which are being relied upon to produce activation. Consequently, the rise time of the impulses used in the process of the invention are oftentimes below two microseconds.

The impulse energy is geared to its discharge time and shape. An overdamped wave would not release enough energy in a unit of time and still be small enough per impulse so as not to cause a burn-out. A damped discharge, while very efficient powerwise, would not present the sharp interruption of the magnetic field which contains the concentration gradient with consequent loss of shock-front pressure for initial dispersal in adequate strength. A somewhat underdamped wave is required. Moreover, it becomes necessary to dilute the gradient after a short period to prevent its burnout. Also, it must not be diluted too much or it will be quenched. The shock-front dispersal helps to achieve the required range for balancing these factors. Various techniques described herein can be deployed in assist in the prevention of gradient burn-out while assuring adequate characteristics.

The impulse duration is measured beginning with the substantially completed rise and ending at the point where the voltage crosses the polarity axis. The primary activating portion of the pulse is actually only the first few microseconds following the rise. Thus the truly effective portion of the pulse is in the region of the peak of energy although some portion of the remainder of the pulse duration is required for the initial dispersal of the gradient. A larger firing anode can use a longer impulse.

The most convenient source of energy is a capacitor storage system actuated by a triggered gas or mercury gap. The stored energy is conducted through a system of leads, etc. having very little inductance. The small inductance stores some of the energy for a follow-through. To keep the impulse energy as real as possible, so that the current does not lag too far behind the voltage, the inductance is kept very small. The amount of inductance which can be tolerated is a function of the resistance of the load and the circuit and this resistance is necessarily extremely low. A larger firing anode presents a lower resistance. Fortunately, such an anode can utilize a larger storage bank to the extent of a longer pulse length. A longer pulse length enables a higher ratio of inductance to load resistance to be utilized.

Usually the practical problem is one of excessive inductance rather than insufficient inductance. Methods are shown herein for facilitating the handling or the countering of this inductance. There will also be shown methods of increasing the peak energy levels within a given number of microseconds while operating within the voltage restrictions.

It can also be seen that voltage is measured at the electrodes. The ohmic and inductance losses are substantial in relation to the load resistance no matter what minimum they are held to, since the current peaks are extremely high. Even when working with extremely efficient systems, there has been encountered voltage drops of 30% to 50% before reaching the electrodes. Even though the wattage of these impulses is in billions of watts, the total impulse energy is negligible since the duty cycle may be as little as one part in a billion billion.

The amount of capacitance in the storage system increases with the firing anode area. Moreover, the volume of the concentration gradient is greater over a larger anode area, and it remains under the firing anode for a longer period even as it moves out. Sufficient capacity is therefore used to maintain the impulse period, as here defined, for about as long as it would take a sound wave to traverse the anode area. Thus an impulse period of about 30 microseconds has been used for a firing anode of one inch radius. At the same time, because of the lowered equivalent of frequency and because of the counter reactance of the capacitors upon the inductance, it becomes possible to withstand a reasonable quantity of inductance even though the decreasing resistance of the larger anode area calls for a decreasing inductance. The lower the resistance, the more the inductance delays the arrival of the peak impulse power. The larger storage capacitor counters the inductive effect in this regard also. Peak levels also arrive to a greater extent for a given period of time by using a higher voltage on the source and transforming the impulse downward. Thus it becomes practical to produce, transmit and successfully fire the high energy impulses required for this invention.

At least in certain cases it is more economical to perform the activation with a number of spaced impulses rather than with a single impulse. Means and examples for determining the best point at which to repeat the impulse are to be described herein. A repetition which is too late can be ineffectual in buttressing, and a repetition which is too soon can be destructive or what has already begun. An impulse at a voltage which is excessive to the point where it ruptures the dielectric is merely useless, that is, it has not been observed to do any harm. Thus in general, the impulses must be accomplished within a range of energy level for a given size and geometry of pot, within a range of duration, within a range of capacitance, within a range of inductance-capacitance-resistance relationship, within a range of firing anode area, and within a range of repetition rate.

It has been discovered that the activation is capable of settling into different levels as will be further described. The pulsing period is preferably predetermined and timed to be completed before one of the earlier levels sets in. Once a level less than the final level has set in, the resistance faced by the firing anode becomes smaller. Unlike the lower resistance of a larger firing anode, where the radius and hence allowable capacity or impulse time is also greater, the radius remains the same. It then becomes necessary to use more controlled and higher energy impulses to break out of one level into a higher level. Therefore, it is more desirable to so practice this invention that the basis is established for the highest level of activation to be attained before the series of impulses is terminated. By a series of impulses is meant continuation of the impulses wherein a succeeding pulse occurs before the termination of the activity of the first pulse. With the help of the drawings, this will be further explained. The resistance does not change very much during the firing but rather in the period, such as a period of about 15 minutes, following the completion of the impulse series.

The inductance-capacitance-resistance ratio should be matched to a fraction of the load conductivity for example a fraction of about one-third of the load conductivity. Such a condition is obtained when the impulse undergoes about a 50 percent reversal of the first peak, as observed on a surge oscilloscope. The capacitance size and the associated step-down pulse transformer should provide a short interval, for example of about 30 microseconds, from impulse peak to the point of the beginning of the first reversal for about each one inch radius of firing anode. The greater the radius, the longer the time required for the concentration gradient to travel out. In any event, the capacitance bank is increased with increasing firing anode radius to the extent that the time is increased. The time constant, RC, is not held constant. As R is lowered due to increase of firing anode area, the capacitance is increased by more than enough to restore the multiple of capacitance and resistance. It will be found that to allow sufficient time to clear the concentration gradient from under the firing anode, the capacitance bank will be increased to approximately the 1.5 power of the firing anode area.

In an additional embodiment of this invention, high voltage D.C. pulses having the same polarity as the continuous low D.C. voltage, are superimposed on the low D.C. voltage at half second intervals. These superimposed D.C. voltage pulses have a peak value in the vicinity of about 1000 volts in the bath, and have an effective pulse width of about one microsecond each. Reflection is substantially avoided or neutralized. This embodiment may be described as a process for increasing the ion concentration near the electrode by enhancing ion mobility, and is referred to hereinafter as the mobility effect.

In a further embodiment of the invention, high voltage pulses having a peak value of 3,000 volts in the bath, and having an effective pulse width duration of from one to ten microseconds or more are superimposed on said low D.C. voltage for a short time, each pulse following the next preceding pulse after a short interval. Anywhere from about one to twenty pulses are made within a period of about 5 seconds, but preferably 6 pulses are made within a 5 second interval. Pulsing is discontinued for a period of about an hour or more during which time substantially increased conductivity is achieved as a result of the pulsing. This second embodiment may be described as a process for increasing ionic dissociation and crystal lattice breakdown, and is referred to hereinafter as the crystal effect. It will be appreciated as described below that these two embodiments may be combined during the electro-winning process.

MOBILITY EFFECT

In the Mobility Effect, both the high and low D.C. voltage supplies are each connected in parallel, preferably to the same electrodes, the low voltage power supply being protected from the high voltage supply by means of a filter choke or the like. The high voltage pulses may be generated by a relaxation type oscillator utilizing a condenser which is alternately charged from a power source and then discharged through an ignitron circuit, or through any suitable switching device. The above-described application of the pulsed high D.C. voltage on the continuous low D.C. voltage provides a greatly increased transfer efficiency therein. In the case of Mobility Effect, the low electrolyzing voltage is preferably permitted to flow during the pulsing. In any event, it must be made immediately available although this is not essential for crystal effect.

Since the processing for mobility effect on the low tension D.C. voltage increases ion mobility and ionic separation in the bath, the resistance of the bath is therefore diminished. At a constant low tension D.C. voltage across the bath, the current is increased. Conversely, the current may be kept constant by dropping the voltage across the bath. There will then be a decrease in the $I^2R$ loss for heating the bath requiring more thermal insulation in order to conserve heat therein. More than 90% of the generated heat is due to carbon anode combustion. Mobility effect pulsing decreases generated heat by about 3%. Thus, the adjustment required is small and easily handled by correction of ventilation, by the addition of thermal insulation or by increased production rate.

Several scientific principles are involved in the phenomena of the mobility effect. The relaxation time, or recollision time of ionic pairs in these fused salt baths has not been determined, but in the case at hand is believed to be of the order of $10^{-7}$ seconds. In the present method, the brief high voltage pulses of the same polarity as the low continuous voltage, push the ions into the continuous electric field thereof. The relaxation time is correspondingly increased to the order of one second, although the curve is substantially flat for about six seconds, as shown by curve A in FIGURE 3. Curve B shows the relative amount of available ions without the use of the high voltage pulses. This will vary somewhat depending on the concentration of alumina in the bath, as well as other factors. The maximum increase of relaxation time is about 40 to 50 seconds. The increase of ion mobility is largely due to overcoming initial ionic inertia and untoward Brownian vectors. At a temperature of 1000° C., some of the crystals are completely broken down, and ionic particles are free to move in a low voltage electric field with the mobility characteristics of ions in liquids. Other ionic particles are associated and thus not available; but under the influence of the pulses of the mobility effect (and also the crystal effect), they become available to the low voltage field, at least temporarily, thus, a slight additional application of electrical energy causes availability of otherwise nearly free, but unavailable particles. The pulses of direct current at 1000 volts and 2 microseconds duration to this. Additionally, by keeping the pulses substantially in the same direction as that of the low voltage field and by keeping the low voltage field immediately available, additional mobility is imparted to the free ions in the required direction. As practiced in this invention, the enhanced mobility lasts about 40 to 50 seconds with decay, which is not appreciable during the first ½ to 6 seconds.

Another aspect of the behavior of ions in a fused salt bath is their inertia and friction. Many an ion which is formed from thermal lattice breakdown may not acquire substantial kinetic energy in a low voltage field due to inertia and initial friction. It may be lost by collision with another oppositely charged ion before it has done any useful work. In the present invention, the 1000 volt pulse supplies the required push to overcome the inertia and initial friction of the ions; but once the latter gain enough kinetic energy, they are maintained in their respective directions toward the electrodes by the much smaller simultaneous continuous low D.C. voltage with only a gradual decay in speed. The high voltage pulses cause the ions to be swept further away from each other, thus increasing recollision time. The recollision time under these circumstances does not reach normal equilibrium for about 40 seconds in comparison with a normal recollision time of only about $10^{-7}$ seconds. Increasing the voltage beyond the intermediate level of about 1000 volts does not perceptibly improve the Mobility Effect.

The superimposing of the unidirectional and codirectional high voltage pulses on the continuous low D.C. voltage thus is believed to have two important effects. The degree of free ionization is increased because of separation of electrically attracted ionic groups; and, furthermore, the ionic mobility which is otherwise governed by the Stokes-Einstein law, is increased and thus permits greater movement of ions in response to the pulses, and this results in an increase in the recollision time.

There is a certain amount of ionic association among otherwise available ions. Such ions do not contribute much to ionic conductivity and the codirectional, unidirectional voltage of the Mobility Effect pulses undoubtedly provides increased separation between ions. It is seen that such separation does not account for the total increase of conductivity caused by Mobility Effect when it is accepted that in alkali halide fused salts only 12% association has been found. A limited Mobility Effect is nevertheless obtained even when impulses are impressed non-codirectionally with respect to the low voltage, electrolyzing current. This is a result of the pulses causing a small amount of temporary separation of ionic pairs. A very low level Crystal Effect may also occur.

The use of fast-rise high voltage pulses in the fused bath causes the problem of reflectance, a phenomenon much the same as the reflection of radar waves. Each pulse will tend to set up a reflected pulse in an opposite direction in the bath, thereby at least in part neutralizing the ionic movement in the desired direction. In order to avoid this reflectance, the impedance of the bath has to be matched by the impedance of the high voltage pulse transmission system as described in detail below. Alternatively, the reflectance must be repressed and preferably by-passed. The inevitable partial mismatch should preferably be in the direction of a somewhat higher impedance than that which the bath actually presents.

As indicated above, the Mobility Effect may be practiced alone or preferably in conjunction with the Crystal Effect described in greater detail below.

CRYSTAL EFFECT

It has been found that a considerable and lasting increase of conductivity of the electrolytic melt can be produced by a series of pulses of voltage higher than that by which the Mobility Effect is achieved and differing otherwise as herein disclosed. These pulses produce the Crystal Effect, causing crystal lattice breakdown and increasing fehlorder.

In the Crystal Effect, a vast quantity of crystal defects, better known as fehlorder, crystal vacancies, and crystal dislocations, are provided in the bath; and a chain reaction of increased fehlorder and consequent free ionization results. The high D.C. voltage pulses of the Crystal Effect are supplied to the bath by either the ordinary electrodes or by one or more independent pairs of electrodes, each pair having a relatively small surface area.

The fehlorder, once created, diffuses at high rate, about 1000 times as fast as ionic diffusion. Within 15 seconds, the fehlorder has travelled through the bath releasing ions from the crystals. These ions now respond like the other ions to the low electrolyzing voltage and to the Mobility Effect pulses. At saturation and at the new equilibrium, fully eight times as many available ions exist in the bath as is normal at the temperature of 1000° C. Eventually, the Crystal Effect anneals out. It may be repeated by a similar series of pulses which may be weaker and fewer in number, depending upon the extent of the anneal. Annealing time is generally from about one to twenty-four hours and it can be much longer or shorter.

If the operational voltage is kept at its original value, the current intensity can be increased by crystal disordering pulses by as much as about 15 times; or conversely, if the current intensity is kept constant the operational voltage may be decreased to as little as about 35% its original value.

Other conditions being equal, the increment of conductivity obtained by the crystal disordering pulses increases up to a limit, with the voltage, with the number and duration of the pulses, the timing sequence and the efficiency of the pulsing electrodes. The pulses preferably must be supplied in sufficiently rapid succession to prevent elastic return of the bath to its original condition between pulses. The timing sequence is a function of the pulse voltage, pulse duration, power factor and the surface area of the electrodes, but having regard for economic factors and local overheating, the bath need not be pulsed more than once every second. Excessive pulsing will burn out the effect, within 15 seconds of the final pulse, in the series of preferably 5 to 20 pulses, the full increment of increased conductivity is realized. Further pulsing produces no appreciably increased increment of conductivity. Unless the Crystal Effect is permitted to anneal out completely or the pot is permitted to congeal, the pulse energy required for restoration of the higher conductivity is less than the original energy requirement.

The crystal disordering pulses may be applied to the electrolytic melt before or during the electro-winning operation.

As indicated above sufficiently high energy level pulses are preferably supplied in sufficiently rapid succession in order to prevent elastic return of the bath to its normal, crystallographic condition in any short period of time. If, however, the energy level of the pulse or rate of succession is below critical values, a limited Crystal Effect is still obtained wherein a smaller increment of conductivity is obtained for a shorter duration. The rate of renewal for this limited Crystal Effect would also have to be more frequent; e.g. a series of pulses every few minutes.

If, after the application of crystal disordering treatment according to this invention, the melt is allowed to cool and solidify and is thereafter melted again, the increment of conductivity has largely disappeared, but a repetition of the original crystal disordering pulses easily restores the increased conductivity.

Crystal Effect is usually the composite of two improvements. The principal part of the effect is to increase the vacancy content of the bath and thus increase the ionic availability. In any event, it increases the reaction rate a given voltage. The other part of the effect could be considered similar to a depolarization phenomena except that it is made available without necessarily placing direct action on the anodes to be involved. The effect here is seen in a lowering of the back E.M.F. of the regular anodes. It appears that the Crystal Effected bath is better able to wet the electrolyzing anodes. It seems also that the bath is more effective in preventing an accumulation of resistive intermediate compounds on the anode. This anode action appears to be the consequence of combination into the cryolite molecule or lattice of a greater quantity of aluminum and aluminum oxide. When the bath is chilled, the first portion of the Crystal Effect is found to be lost upon reheating. The second portion i.e. the superior capability for wetting carbon anodes, generally remains even after the chilling and remelting of the bath. This depolarization is unique in that the electrolyzing anodes need not be involved in producing this effect. They need not even be present. I have produced the effect with an auxiliary anode, and its consequence was noticed on several carbon anodes with which I electrolyzed the bath. I have produced the effect using one of the carbon anodes, and an unfired carbon anode became an equal beneficiary. I have replaced these carbon anodes, and the new carbon anodes were equal benficiaries. This new depolarization phenomena would appear to have become an attribute of the bath. The two portions of the Crystal Effect need not necessarily coexist but preferably the bath is pulsed so that they do. Moreover when a higher level of activation is reached with Crystal Effect, it is found that the second portion is likely to be greater as seen in the lowering of the back E.M.F. In the case of high level Crystal Effect, such as where 2 volts now carry the current of 5 volts, the back E.M.F. is apt to show a lowering to about 0.6 volt. Thus the second portion accounts for about 20% of the total gain in that case.

Once this increment of conductivity has been obtained it is affected neither by a reversal in the direction of the pulses nor by a reversal in the direction of the continuous current. Mobility Effect, on the other hand, would definitely be affected by this reversal of polarity.

In order for the conductivity to be raised to the highest steady state level possible, the pulses must be long enough in one direction as well as strong enough to exceed the fatigue or elastic limits of recovery of the crystals in the melt. However, the length and strength must not be excessive or the concentration gradient may be burnt out, or it may fail to form due to an electronic avalanche. As in fatigue crystal stressing, duration of stress is important provided the stress is high enough, the greater the stress the smaller the required duration. A stress which does not bring about crystal disordering will result in elastic return just as if no stress had ever been applied. Thus, the pulses must be repeated in sufficient succession so that the effect of one pulse does not anneal out before the next pulse adds its stress. The pulsing is continued until the crystal becomes irreversibly stressed. The smaller the firing anode in relation to a given size and geometry of pot, the greater are the number of impulses which are required. Also the smaller the firing anode the more rapidly do the impulses of a given series follow upon each other. A small firing anode is preferred so as to mitigate the size of the condenser bank and the need for corrective equipment. The firing anode area is preferred in the range of 1% to 5% of the low voltage electrolyzing anode area.

The dielectric strength of the melt limits the magnitude and duration of the stressing voltage. Pulse oscillations, by reflection or otherwise, do not nullify the Crystal Effect, once it has been achieved, but they lower the dielectric strength and limit the pulse duration from the crystal disordering point of view, without increasing the time factor for dielectric breakdown. An excessive pulse length like excessive pulse repetition rate moreover has a deleterious consequence.

It is known from thermodynamic studies of metallurgical melts that at the so-called melting point the solid state does not completely disappear. The crystalline and liquid states coexist even though there is liquefication. The percentage of matter subsisting in the crystalline state diminishes as the temperature is increased beyond the melting point. The crystal disordering treatment, according to this invention, produces an effect similar to that of increasing the temperature of the bath, without the loss of salt attendant upon high temperatures which cause decomposition.

In the fused cryolite-alumina bath, there are in effect ionized constituents still unfree and locked in the crystal lattice form, and to achieve the breakdown of the lattice, with the consequent freeing of additional ions, various techniques may be employed: temperature increase, ionizing radiation, and high voltage. At the present time, the industry is using only the lower limits of high temperature of the melt to achieve ion separation and lattice breakdown. If, in addition, a high voltage pulse is applied, according to the processes of this invention, there is further lattice breakdown with release of additional ions. Electrons are kicked from the trapped level to the conductance level. Other disturbed electrons which do not quite make it to the conductance level, set off coronal effects which produce phonons. These phonons have the ability to establish further crystal dislocations and to kick other and fewer electrons into the conductance level, producing more fehlorder and more ionic movement. The higher the temperature, the lower the voltage needed for a given degree of improvement. It should be noted that coronal effects are useful only if they produce fehlorder.

In a melt to which a crystal disordering treatment has been applied, lattice structures reform very slowly. As they reform conductivity drops. The annealing time is more than one hour, however in an average level of activation, and then decay of the higher conductivity may become noticeable. New pulses restore the new equilibrium. The disordering of the lattice structures, in effect, frees ions formerly held by the crystal lattice. Thus, while the Ion Mobility Enhancing Effect does not release new free ions, the Crystal Effect pulsing does so. The Crystal Effect changes the very nature of the bath material. This change corresponds to an allotropic change in the crystals wherein the original type crystals are restored only by resolidification, long annealing or other similar drastic measures. Moreover, it appears that a greater amount of aluminum and aluminum oxide becomes a combined part of the cryolite molecule or lattice. A larger amount of aluminum oxide remains in the bath at anode effect and a larger percentage of aluminum is dissolved in the bath as shown by the deeper color on fast chilling. On fast chilling, the effect of these combined materials is apt to remain and be observed again on reheating in the form of a lower back E.M.F.

In the Schottke-Wagner mechanism a phonon is expected to produce a dislocation and another phonon. The impulses herein produce both thermal and light phonons beyond the normal quantity available in the molten bath. Since these phonons not only produce dislocations but also additonal phonons, we would appear to have a mechanism for the chain reaction which is observed with the use of this invention. The vacancy content of the normal molten bath is of a low order of magnitude. When saturation is attained by the use of the Crystal Effect herein it is still of a low order, but apparently the now order is about ten times as high. This would seem to account for the successes of the improvement with so small a quantity of pulse energy. It had been presumed hitherto that millions of volts would be required to smash crystals. However, while the importance is enormous, there is really very little crystal degeneration in this process. The heat of the bath is adequate to supply the energy for maintaining the chain. The bath is preferably about 10° C. above the minimal fusion point when firing an activation series as additional heat is drawn from the bath during the development of the Crystal Effect following the nucleation by the initial concentration gradient.

The upper limit of the pulse voltage is selected to prevent an electronic short circuit. A number of conductivity electrons are released, however, to deliver the electrical wave to the crystal boundaries. Increased separation of the firing electrodes helps to retard the onset of an electronic short circuit or avalanche, but it also increases the volume of the concentration gradient to be formed.

The Crystal Effect, because of its permanence, lends itself to application by portable equipment. Such equipment can be plugged into the existing anode and cathode of a conventional pot. Codirectionality of the pulsing current with respect to the electrolyzing current is not a requisite for the Crystal Effect. Indeed separate auxiliary pairs of electrodes can be used which are much smaller in area, thus reducing the impedance matching problem. The electrode may also be of special material, such as platinum-clad material and metals such as tungsten whose oxide sublimes from molten cryolite. Oxidizing materials are preferred. Nickel in pure or alloy form is especially effective as an auxiliary anode for aluminum smelting. These electrodes can be permanently attached to a portable pulser of the type described below, and introduced through the crust in the annular space between cathode pot and the anode group. The auxiliary electrode may also be a single electrode, the pot itself, e.g. the normal cathode, being the other electrode.

Summarizing briefly the characteristics of Mobility Effect and Crystal Effect pulsing, it may be stated that Mobility pulses of duration very much longer than 10 microseconds are not appreciably more effective in improving the transfer efficiency of the bath; nor are these pulses more effective with an increase in the peak voltage above about 1000 volts. Mobility Effect does decrease, however, if application of the low electrolyzing voltage is discontinued or if the direction of the pulse current is counter to that of the electrolyzing current.

On the other hand, it is an advantage of the Crystal Effect pulsing in that polarity of currents is not an important factor. The polarity of the Crystal Effect current may be reversed during application, and the low voltage electrolyzing current may even be shut off during pulsing. Crystal Effect pulses are more effective in longer duration depending on firing anode area. The duration is limited however in that it is necessary to maintain peak values and the total energy per impulse is limited so as not to incur a breakdown or burnout. As compared to Mobility Effect pulses, however, Crystal Effect pulses require high voltages in order to supply a critical quantity of energy to the bath during a restricted pulsing period. Crystal pulses can be applied with a single electrode, a pair of electrodes or several auxiliary electrodes. The effectiveness of the electrodes is dependent upon their overall surface area and the total required surface area is a function of the shape of the cell, the volume of the fused salt and other parameters. Individual electrodes may be relatively small and positoned anywhere in the bath, in any direction. The material of the electrodes is a factor in the effectiveness of the Crystal Effect. Although reversal of Crystal Effect current is permissible, it is to be largely avoided to the extent that it is caused by reflectance, since reflectance is symptomatic of a poor power factor. A controlled amount of net inductive reactance is desired.

Mobility Effect pulses must be provided continuously; Crystal Effect pulses need be supplied only once in a long period of time, or from one to twenty-four hours. Mobility Effect pulses are effective in improving the transfer efficiency of both a normal or conventional bath, or of a bath which has been pulsed for Crystal Effect. Both the Mobility and Crystal Effects may be used with any fused salt electrolyte, provided only that the temperature of the bath is sufficiently high, so that the lower critical limit of the impressed high voltage does not exceed the upper critical limit.

Other objects and features of the invention, in addition to those described above, will become apparent in the following description and claims, and in the drawings in which:

FIGURE 1 is a schematic diagram of a form of electrical circuitry used with the present invention;

FIGURE 2 is a graph of the voltages applied in the embodiment of this invention exemplifying the pulsing for Crystal Effect;

FIGURE 3 is another graph showing the electrical behavior of the bath as a result of Mobility Effect;

FIGURE 4 is a schematic diagram of a form of electrical circuitry used for achieving the Crystal Effect;

FIGURE 5 is a side elevation view, in partial section, of one embodiment of an auxiliary electrode pair for use in Crystal Effect pulsing;

FIGURE 6 is a schematic representation of a switching arrangement for alternately connecting a source of high energy impulses to one of a plurality of pots;

FIGURE 7 is a schematic representation of an apparatus for producing high energy impulses and transmitting them to the bath;

FIGURE 8 is a schematic representation of an apparatus similar to that of FIGURE 7 and including a pulse transformer;

FIGURES 9A and 9B are schematic representations of apparatus for producing the high energy impulses and transmitting them to an auxiliary electrode;

FIGURE 10 is a graphical representation of the level of relative activation plotted against the quality of the impulse group;

FIGURES 11A and 11B are graphical representations of the voltage of the impulse, obtained with the equipment such as that of FIGURES 4, 7, 8, 9A or 9B, plotted against time in which the shaded portion is the region of primary interest for activation;

FIGURE 13 is a side elevational view of an additional embodiment of an auxiliary electrode for use in pulsing;

FIGURE 14 is a schematic diagram of the impulse timer;

Figure 9A:
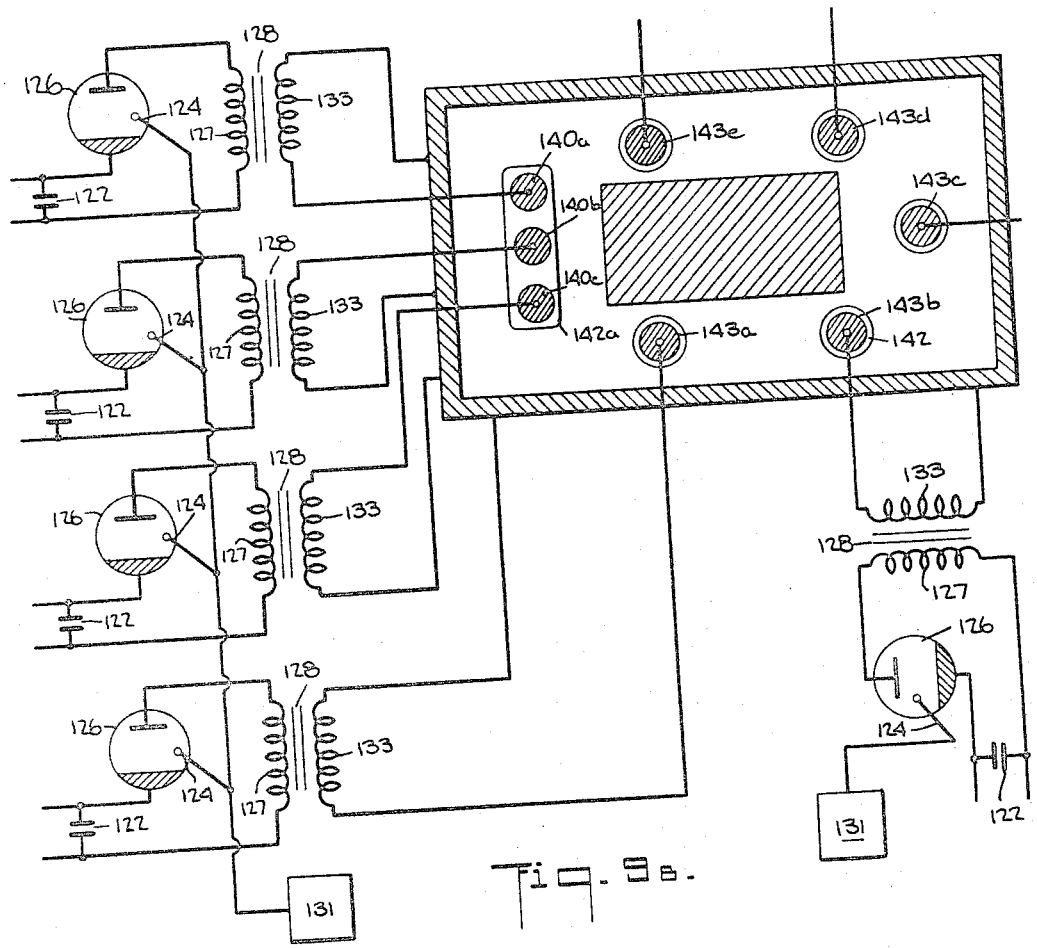

In the drawings, such as in FIGURES 7, 8, and 9A optional equipment for the purpose of modifying the power factor, impulse period, or rise time is encircled by dashes.

Referring now to the drawings, and in particular to FIGURE 7, the electrolytic cell is shown schematically and designated generally by the reference numeral 110. Pot 110 is a conventional one, having carbon lining 111 and containing molten bath 112 of halide salts and alumina which is maintained at a temperature of about 1000° C. by combustion of the carbon anode, by electrical losses within the bath, and by external heating or cooling. Carbon electrode 113 is disposed in melt 112. The conductive lining of pot 110 or an equivalent conductor serves as the second electrode 111. Both electrodes 111 and 113 are connected to a source of continuous low tension D.C. voltage of about 5 volts, such as generator 114 depicted in FIGURE 7.

Associated with pot 110 and its electrical circuitry is circuit 115. Step-up power transformer 116 has its primary 117 connected to a conventional A.C. voltage source (not shown). The secondary 118 of transformer 116 has a series-connected rectifier means 119 producing rectified half-wave voltage across out-put terminals 120 and 121 to which is connected storage capacitor 122. Capacitor 122 is of sufficient capacitance to store the energy of one impulse. The criteria for selection of capacitance is given herein for a small firing electrode. Depending upon voltage, etc., it will range from about 6 microfarads to about 50 microfarads per square inch of effective anode area. When using a step-down transformer, these capacities decrease with the square of the transformer turns ratio. With increasing sizes of the firing anode, the capacitance becomes approximately proportional to the area taken to the two-thirds power.

Resistor 123 limits the rate of charge of the storage capacitor 122. Capacitor 122 is of the low internal inductance type. The rate of charge is sufficient to satisfy five time constants in the period between discharges. A one to five ampere charging rate will be found adequate for many pot sizes. The series repetition rate for firing up Crystal Effect is approximately 50 per second to one per minute, the rate being lower for a larger firing anode. Thus one fires a small capacitor bank more frequently, or a large capacitor bank more infrequently, the charging rate determined by resistor 123 therefore being in the same general vicinity.

Ignitron 126 is provided with cathode 130a which is connected to junction 121 (FIGURE 7). Ignitor 124 of ignitron 126 is fired by any conventional means such as relaxation oscillator device 131 which spaces the impulses and contains an overall timer for shutting them off. Anode 130b of ignitron 126 is connected to cathode 111 of cell 110 or to a special high tension cathode 47 shown in FIGURE 5. Junction 120 is connected to the firing anode, which in the case of FIGURE 7, is also regular anode 113 or a part of the regular anode 113 if anode 113 is comprised of parallel connected segments. Optional pulse rectifier 161 can be inserted between junction 120 and junction 154. Resistor 160 can also be connected between the junction 120 and junction 154. Capacitor 132 can be connected between junction 154 and the anode of ignitron 126.

Surge oscilloscope 165 for observing variables such as voltage, impulse duration, power factor, etc. is connected closely to the position of the firing anode and is connected by coaxial cables 165a across junction 154 and junction 155. By compensating for line drop, the oscilloscope need not be so closely connected. Volt meter 166 with a range to about 7 volts is connected between anode 113 and cathode 111 of cell 110. Optionally, the ammeter 167 may be inserted in the lead from generator 114 to anode 113. Generator 114 supplies low voltage between anode 113 and cathode 111. Optionally, cathode 111 of cell 110 may be connected to ground 138 by a combination of optional elements including resistor 139, capacitor 136, and rectifier 137. In the event optional rectifier 161 is used, the blocked reverse inductive energy which would otherwise be applied to the melt can thus leak off and not interfere with succeeding impulses.

In FIGURE 8 there is shown a similar circuit wherein a pulse transformer 128 steps down the impulse voltage from energy storage 122. It also shows use of resistor 168 in series with the primary of pulse transformer 128, whereby a small quantity of resistance substantially improves the phase relationship between the current and the voltage of the impulse. It is also necessary to prevent short circuiting of the voltage from generator 114 by secondary 133. Either rectifier 125 or capacitor 162 can optionally be employed to enable the impulse to pass while satisfactorily blocking the low voltage from transformer 128. The circuit also includes phase correcting capacitor 132b in primary circuit 127 of transformer 128, although it may also be used across secondary 133. Optional rectifier 125 enables the use of a larger capacitor 122, without gradient burnout. Similarly, optional capacitor 162 can at the same time assist in phase correction. Capacitor 162 is necessarily very large in capacitance but in this position its phase correcting assistance is adequately small.

FIGURE 9A shows a circuit having auxiliary anode 140 for high tension firing. The auxiliary anode is not directly connected to the low voltage supply. It is fired through the secondary of pulse transformer 128 although it may also be used with the circuitry of FIGURE 7. I have found that in the employment of the apparatus of FIGURE 9A, it is not necessary further to isolate the low voltage source from pulse transformer 128.

In FIGURE 9A, auxiliary anode 140 is preferably shielded with insulator 142. The material of auxiliary anode 140 can be amorphous carbon while the material of insulator 142 can be boron nitride. The material of the anode 140 can be a metal such as tungsten, the oxide of which sublimes at the temperature of the melt, or any other suitable conductor preferably one that is oxidizable. Cell 110 is shown with frozen cryolite 163 which serves to insulate the side walls of the cell and this further assures maintenance of the predetermined gap between auxiliary anode 140 and cathode 111. Shielding 142 can be found to be useful in preventing flashovers in the ionized gases immediately above the melt.

In FIGURE 9B, auxiliary anode 140a is shown shielded and separated by insulator 142a but closely spaced to auxiliary anodes 140b and 140c. Each of the auxiliary anodes is connected to a storage capacitor 122 firing through ignitron 126 and all the respective ignitors 124 are fired substantially in unison by firing device 131.

FIGURE 9B also shows auxiliary anodes 143a–143e spaced around the pot for simultaneous or intermittent firing from the same or different high energy sources. These additional auxiliary anodes can be desirable when one is concerned with the short term effects which are available at the lowest activation levels. The group 140a–140c is a system for mounting one firing anode in several insulated sections. Thus each section requires a smaller switch and presents a higher load resistance. The switches are triggered simultaneously for such a system.

In order to place the apparatus of FIGURE 7 into an operating condition, primary 117 of transformer 116 is connected to an A.C. supply, such as 440 volts, and a high voltage is produced in secondary winding 118. This voltage is rectified by rectifier means 19 and is delivered through variable resistor 123, and storage capacitor blank 122. The firing repetition rate and the termination of the impulses from this storage bank is regulated through timer 131 which actuates ignitors 124.

The leads in the circuitry connecting the capacitor storage bank to the bath can be wide foils which are closely spaced in order to minimize their inductance. Opposite lines are, where possible, closely spaced. The lines are separated by insulation such as sheet mylar, so as to present a minimum quantity of transverse area between the opposite leads, thus reducing the quantity of inductance. Engineering information for the production of impulses of the order of magnitude herein required is given in such generally available treatises as "Exploding Wires," edited by William G. Chace, Geophysics Research Directorate, Air Force Cambridge Research Center, and Howard K. Moore, Lowell Technological Institute Research Foundation, Plenum Press, Inc., New York.

On the other hand, it is desirable that a part of the impedance (for example about 40 percent) be inductive. Low inductance enables the impulse energy to be discharged rapidly. The inductive portion of the impedance should be sufficient, however, for the follow-through. The capacitor storage bank 122 is of such size as to maintain the peak voltage for at least one microsecond at the firing electrodes. It is desirable that the current have a small lag behind the voltage, but not so large a lag that the high voltage impulses are without a sufficient quantity of real power in the first quarter cycle of the discharge. The impulse decrement, shown on oscilloscope 165, is indicative of this power factor unless the shape is distorted by a pulse rectifier or a crow bar circuit, etc., without however, thereby altering the power factor.

It is understood that, provided the impulse is properly shaped, it is not necessary that a capacitor bank be the primary storage source. Primary storage can be magnetic or electrostatic or a direct current generator with a flywheel. Activations have been performed with inductive storage as the primary source of impulse energy, but capacitor storage can be preferable.

The practicality of the inductance problem is to restrict it to a low level. In the circuitry of the invention, this is done by maintaining the total inductance, including the inductance of capacitors, pulse transformers and leads, at a low value such as about 0.15 microhenry. The lower the resistance into which the impulses are fired, the lower is the quantity of inductance which can be tolerated. Moreover, means, such as capacitor 132 can be utilized for overcoming the tendency of the inductance to reduce the peak voltage and to delay its arrival and produce excessive current lag. Cacapitor 132 (FIGURE 7) can be relatively small, generally in the range of about one-half microfarad. Capacitor 132b (FIGURE 8) is much smaller than capacitor 132, depending upon the transformer step-down ratio. The use of resistor 160 (FIGURE 7) which, while requiring a higher source voltage, enables the handling of an extremely low resistance within a practical range of inductance.

Inefficiency in the use of electrical energy in the impulse circuit is serious only to the extent that it adds to the cost of the equipment of the storage circuit. In view of the energy requirements of the overall process, the impulse energy itself is wholly negligible in a reasonably designed circuit. The use of impulse rectifier 161 enables the total energy of an impulse to be limited since it could otherwise, due to excessive duration, burn out the concentration gradient which it is desired to produce. At the same time, rectifier 161 enables the use of a larger storage source 122 for the purpose of decreasing the problem of maintaining a high power factor in the impulses. However, the lower resistance is primarily due to a larger firing anode and a larger firing anode can accept a larger storage capacity to the extent of a greater pulse width. The inductive reactance varies inversely with the pulse width.

For control purposes, transformer 128 (FIGURE 8) can be provided with means for saturating its magnetic circuit with appropriately timed D.C. current in the coils taken together with a limited magnetic capacity. Thus the saturation device can stop the flow of impulse current long enough for switching means or ignitron 126 to shut off. Thus a larger capacitor in the source, by prolonging pulse length, reduces the inductive factor without the impulse being excessively long in cell 111.

A crow-bar device wherein a timed counter tension is introduced may similarly enable the shutting off of ignitron 126. Such circuits may also be used to short circuit the impulse source. Crow-bar circuits are conventional and are not shown. (See General Electric Co. Bulletin PT–41).

With respect to the circuitry, it is understood that ignitron 126 is an example of a suitable switching device and that other such switching devices such as a triggered spark gap can be used.

In industrial practice, a large number of pots are placed in series and connected to generator 114, which supplies sufficient voltage to supply the low voltage required by each of the pots connected in the series. All the pots may be activated in unison from a single supply or from individual supplies attached to each pot, or through individual supplies attached to each segment of the firing anodes of each respective pot. However, it may be preferable to employ portable firing equipment which plugs into a preplaced anode structure or which carries its own firing electrodes, in order to fire each pot separately. The pulse shape and parameters may be observed in a surge oscilloscope connected close to the firing electrodes. The oscilloscope can be connected at a distance from the firing electrodes if correction factors are employed in the interpretation of the parameters. Once it is established that the proper impulses are being used, volt meter 166 or ammeter 167 is the best guide for determining when to repeat the impulse, when to terminate the series, and when to restart the series. Thus the firing pattern is also predetermined, and thereafter the firing is preferably done on this predetermined basis.

In FIGURE 1, the electrolytic pot or cell is shown schematically and designated generally by the reference numeral 10. Such pot 10 is a conventional one having a carbon lining 11, and containing the heated bath 12 of fused cryolite-alumina maintained at a temperature of about 1000° C. by the combustion of the carbon anode and by the $I^2R$ loss generated by the passage of the electrolyzing current through the bath. Carbon electrode 13 is disposed in the bath 12. The carbonaceous lining of pot 10 serves as the second electrode 11. Both electrodes 11 and 13 are connected to a source of continuous low tension D.C. voltage, of about 5 volts, such as generator 14, depicted in FIGURE 1.

Associated with the above pot 10 and its electrical circuitry is the relaxation oscillator circuit 15. Step-up power transformer 16 has its primary 17 connected to a conventional A.C. voltage source (not shown). The secondary 18 of transformer 16 has a series-connected rectifier means 19 producing a rectified half-wave voltage across output terminals 20, 21 and is of sufficient capacitance to store the energy of one pulse. For each square centimeter of electrode, the capacitance may total from about one to eight microfarads.

The variable resistor 23 limits the rate of charge of the storage condenser 22, the latter being of the pulse or low internal inductance type.

An ignitron 26 is provided and the cathode 11 is connected to the junction of resistor 23 and condenser 22. The cathode is optionally connected through the primary 27 of step-down transformer 28 to the opposite side terminal 21 of condenser 22. The grid 24 of the ignitron 26 is appropriately biased by any conventional means such as the relay or firing timer 31. Neon bulb 32 is shunted across the primary 27 to indicate delivery of pulses to the primary 27 in a fashion soon to be described. The secondary 33 of step-down transformer 28 is connected to the electrodes 11 and 13 of the bath 12 as shown. Filter choke means 35 is series-connected to one side of the low tension D.C. circuit to protect the D.C. generator 14 from the high voltage pulses delivered to electrodes 11 and 13 by the relaxation oscillator circuit 15. Ordinarily, the generator and generator circuit have ample choke inductance, however.

The apparatus depicted in FIGURE 1 is particularly adapted for Mobility Effect pulsing but may also be used for Crystal Effect pulsing. In FIGURE 4, apparatus modified for Crystal Effect is shown. A relaxation oscillator circuit 15B, approximately equivalent to that described above, is also employed in this modification. Pulses of from about 1000 to 3000 volts are produced in bath 12B by adjustments in circuit 15B and step-down pulse transformer 28B. Electrodes 40, 41 are connected through transformer 28B to the oscillator circuit 15B. The electrodes are small and portable, and may be removed from bath 12B when necessary. Auxiliary electrodes may be employed in pot 10B if it is desired to enhance the Crystal Effect therein. These auxiliary electrodes are similar to electrodes 40, 41. Each auxiliary pair may have its own source of pulse energy, or an entire array of auxiliary electrodes may be serviced by a single power supply. An independent, low tension D.C. circuit is required to deliver the electrolyzing current to pot 10B.

Generator 14B generates the required E.M.F., and is connected to anode 13B and liner 11B of pot 10B which serves as the cathode. Electrodes 40 and 41 are stranded for better surface conductivity, and they are twisted (as in FIGURE 4) or coaxial (FIGURE 5) for minimum reactance. The firing tips are preferably made of tungsten, nickel and nickel alloys such as nichrome; and they may also be made from other conducting, non-melting materials such as platinum, graphite or the like. Oxidizable material are preferred, however, particularly at the anodes. Electrodes 40, 41 are also insulated except at the discharge faces by an insulating material 42 such as boron nitride. Insulating material 42 extends above the bath 12B. This prevents shorting by hot gases above the bath. The discharge faces are preferably fabricated in a way which permits easy replacement, e.g. by means of threading.

The general operation of the apparatus described above, for obtaining either the Mobility or Crystal Effects, may be described as follows, it being understood that this invention is not to be limited by the operation so described. With the primary 17 of transformer 16 connected to a 440 A.C. voltage supply, a very high voltage is produced in the secondary winding 18. This voltage is rectified by rectifier means 19, and is delivered in the form of half-wave pulses through variable resistor 23 to condenser 22. The resistor 23 is adjusted, for example, to charge the condenser 22 at rate sufficient to enable it to cause one flash of neon light 32 every half-second for the Mobility Effect described below, or 6 flashes in a five-second period for the Crystal Effect also described below. Firing may be set to occur at the point at which the condenser charges to its full voltage, the ignitor being prebiased accordingly; or by regulating the discharge by firing the ignitor through timer 31.

By a succession of such half-wave pulses, condenser 22 is charged to a pre-selected voltage, at which voltage the operating potentional of the ignitron 26 is reached as determined by the bias voltage applied to the ignitor 24 by firing timer 31. This causes ignitron 26 to fire or conduct, thereby discharging condenser 22 through the ignitron 26 and into the series-connected primary 27 of step-down transformer 28, producing a high voltage D.C. pulse which is delivered to transformer secondary 33 and thence to the electrodes 11 and 13 or 40 and 41 (see FIGURE 4). In a modification of this apparatus, transformer 28 may be eliminated or bypassed, and the current discharged from condenser 22 may be delivered directly to the electrodes 11 and 14 or 40 and 41. The alternate charging and discharging of condenser 22 takes place at a rate determined by the adjustment of either or both the variable resistor 23 and the timer mechanism 31. The impedance of the discharge path is such that a sharp pulse can be obtained, whereby about 90% of the power stored in the capacitors is discharged in about one microsecond (see FIGURE 2). Condenser 22 is of a size such that it will provide bath 12 with the current required for a high voltage discharge through the extremely low resistance of the fused salt bath.

It is understood that inductance or magnetic storage means can be utilized in the pulse generator circuit. When the apparatus of this invention is to be used with a plurality of electrolytic pots, a direct current generator and flywheel switching apparatus (not shown) may be used to feed current directly to the switching tubes, which would be timed in synchronization with a rotary switch 60 (FIGURE 6) connected to pots 10 as described in more detail below.

The resistance of the bath is approximately .0001 ohm. When using the anode 13 as an electrode for Mobility Effect, it is necessary to match the impedance of the oscillator circuit 15 to the bath impedance in order to avoid reflectance, which would tend to promote movement of ions in a direction opposite to the desired direction and thereby destroy much of the gain in mobility.

The various reactive components in the oscillator circuit are balanced as previously described. The ignitron and storage capacitor may have about a 0.015 ohm peak resistance when conducting, and for an impedance match between 0.015 ohm on the primary side 27 of step-down transformer 28 and .0001 ohm on the secondary side 33, it is necessary to have a turns ratio of about 12 to 1. Thus, to get a peak pulse of 1000 volts in the bath 12, it will be necessary to have the condenser 22 charge to a predetermined voltage of about 22,000 volts. If the electrolytic cell has any inductive impedance, it is possible to neutralize such impedance by interposition of a condenser (not shown) in the secondary circuit 33 of the step-down transformer 28. If the inductance is small, the condenser is preferably connected in parallel with the cell electrodes; if the reactance is large, it is advisable to place the condenser in series. The pot will probably have an excess of internal capacitance which may be adjusted with inductance in the leads to the pot 10.

In order to eliminate negative reflectance or space charge due to any impedance mismatch which may remain even after the impedance matching outlined above, the cathode 11 may be connected to ground 38 via a condenser 36 and diode 37 to permit the reflectance potential to leak off.

The ignitron 26 may be, for example a 6228 ignitron which will handle 60,000 amperes at 40 kilovolts, with an internal resistance across the tube, plate to cathode, giving a drop of about 10 to about 50 volts. Other types are also acceptable, such as the 5551B ignitron. These tubes may be overloaded to about 100 times their rated capacity at the duty cycle used herein; and they can be used in an oscillator circuit as described above and shown in FIGURE 1. Triggered gas gaps can also be used.

Additional circuitry can be used to supply high voltage pulses to a plurality of electrolytic pots or a plurality of auxiliary electrodes from the same oscillator circuit. There can be provided a bank of thyratrons, ignitrons, or other such switching tubes can be actuated by a relaxation oscillator functioning in synchronization with a rotary switch (not shown), so that the switch moves between contact points during the non-conducting periods of the tubes, and remains in contact with such points during the conducting periods. The length of the conducting period is naturally governed by the width of the contact point. Each contact point is connected to a different electrolytic cell or auxiliary electrode preferably with its own pulse transformer 28 and impedance matching network.

Since the above tubes are capable of firing hundreds of times per second, such a bank of switching tubes would serve a line of pots for Mobility Effect, or would serve multiple auxiliary electrodes for Crystal Effect, when it is deemed advisable to employ such auxiliary electrodes in one or more electrolytic pots.

Inasmuch as an identical impedance match is extremely difficult, if not impossible, to achieve, it is better to match for an impedance slightly below that of the effective bath portion, which may be described as that portion of the batch situated between the electrodes. The use of several low inductance condensers at 22 in FIGURE 1 will result in greater matching latitude.

A pulse strength of 3000 volts with a pulse duration of preferably 10 to 1000 microseconds will produce the Crystal Effect. It is also necessary to maintain a power factor of at least 65% and to use a sufficient number of electrodes such that the total effective electrode surface area will achieve the desired results. As stated above, the surface area required to produce a given Crystal Effect is a function of the volume of electrolyte, shape of the electrolyte cell, composition of the bath, location of the electrodes in the pot, composition and structure of the anode and the crystal state of the bath as a result of previous Crystal Effect pulses. Using independent high tension electrodes with an area of 1 cm.$^2$, and spacing of 2 cm., one might use a 3 to 1 stepdown transformer which delivers 1500 volts of about 40 microseconds duration. This would accomplish the requisite impedance matching, the impedance between such independent electrodes being much higher than 0.0001 ohm. If the regular electrodes are used when practicing Mobility Effect pulsing, isolation is necessary; e.g. by rectifier means 25. Isolathrough secondary 33. Isolation is achieved in the apparatus of FIGURE 4 by maintaining two separate circuits, one for the low D.C. electrolyzing current and one for pulsing.

A plurality of special electrodes may also be used and may be actuated simultaneously or sequentially. If the tion prevents shorting out the low D.C. voltage supply regular cathode 11B is used, it is preferable to bring the stranded line up to the bottom of the pot rather than have the pulse travel down the side of the pot.

Dielectric breakdown within the pot must be avoided and the pulse must not be weakened by dissipation or shortened by discharge through the ionized gases above the pot. The leads are insulated at 42 for some distance above the pot 10B as shown in FIGURE 4. A less active metal, such as platinum may be used as the cathodes of an auxiliary set, while replaceable oxidizable metal tips form auxiliary anodes. Platinum may also be used to coat the non-firing portions of the auxiliary electrodes.

FIGURE 10 shows the activation level in relation to the rise time as well as the power and voltage shape of the impulses and their number and spacing. When optimally carried out, the highest level is reached. This level has the greatest duration and the greatest advantage in terms of overall improvement of conductivity. It can be seen that the curve is not continually upward. Moreover, once a level is obtained and stabilized, it can be more difficult to bring it to a higher level since there is then presented an established lower resistance without the larger anode area which would allow a larger storage bank to be used with it. Various devices herein described may now be used to so refine the impulse shape and power that it is possible to break out from one level into a higher one.

It is far more satisfactory to predetermine the parameters and to continue the application of impulses with a satisfactory shape, etc., before any one activation level has reached a stabilization point. Depending upon the size of the pot, the entire impulse firing can be completed in a period of time such as about 15 seconds to two minutes, with the stabilized level, particularly for the better levels of activation, being reached after a longer period, such as in about 15 minutes. The very lowest level of activation will not necessarily last even 15 minutes. However the lowest level of activation alone represents a very substantial gain compared to any previously known power saving improvement for the electrolytic reduction of alumina. Of course, the higher and more durable levels of activation are preferred.

It is desirable, therefore, to predetermine by a few experiments, the pattern which will result in a higher activation level. The pattern is complete in an initial period, for example a period of about two minutes, while the activation for that predetermined level is reached after a subsequent period, for example 15 minutes later. The impulse series initiates the chain and the chain then builds itself.

Figure 11A:
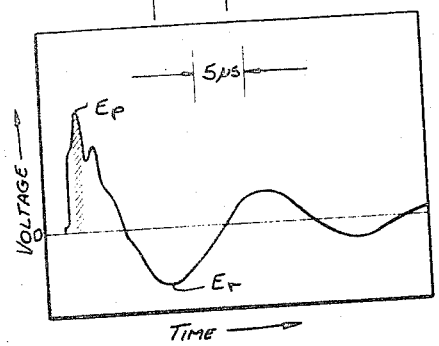

There is shown in FIGURE 11A and FIGURE 11B, successful wave shapes which have been photographed in the course of carrying out some of the examples which follow. It will be seen that there is a period of rise to the peak voltage. This period is generally from about 0.3 microsecond to about 1.5 microseconds. There is now a region, shown shaded in the drawings, from about one to about five microseconds wide which is subsantially at peak levels of power. Now follows for a number of microseconds, depending upon the size of the firing anode, a lower grade of follow-through energy. At this point, the impulse can damp out or reverse. As a practical matter, the small amount of reversal is to be preferred, but a large amount of reversal would indicate an excessive lag between current and voltage in the impulse. Through such devices as rectifier 161 or crowbar or saturated transformer devices lack of reversal is not seen as a true indicator of power factor. This fact should be taken into account in evaluating the reversal.

Figure 12:
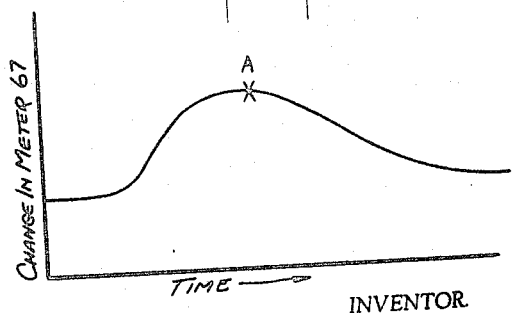
FIGURE 12 is a graphical representation showing the effect of an impulse, as measured by the meter or a low voltage anode, on the conductivity of the pot in the few seconds immediately following the impulse, and also the optimum point for a refiring.

Having shown successful impulse shapes, there is now shown with FIGURE 12, a way to determine the successful point at which to refire the impulse before obtaining the stabilized level from which it is difficult to rise. Assuming that the low voltage is constant, the current in the low voltage anode will rise for a few seconds and possibly begin to fall as shown. If the current does not rise, the impulse has been totally ineffective and must be reshaped. The fall as shown in FIGURE 12 will take place even though the impulse is to be eventually successful and even though a series of like impulses will in the succeeding 15 minutes produce a good level of activation. Point A shown in FIGURE 12 is the ideal time to fire the next impulse. Additional impulses may be fired before Point A is reached. In that case, they will be less efficient. Unless the additional impulse is fired at some point of the rise, its chance of being effective is reduced and each impulse may be thus individually extinguished without producing any permanent effect or without producing an effect which is greater than would be enjoyed as a result of a single such impulse. If the impulses are fired too soon upon each other, the concentration gradient may be destroyed, and the series of impulses will be worth even less than a single one of them. The consequence would be similar to that of an extremely long pulse. It is therefore, advisable to fire succeeding impulses somewhere in the rise, preferably just before the descent at point A. When experiments are made with a small firing anode, i.e. about 0.15 square inch, and correspondingly small capacitor 122, point A is reached in about one-fifth of a second. With a firing anode area of ten square inches, it has been found that point A is reached in about 15 seconds or more. In any event, it would be satisfactory to fire again within 15 seconds. With these guides, it will be possible to place any plant into operation with this invention within a reasonable period of time. The observation of FIGURE 12 results from the passing of the vicinity of the initial gradient by the observing anode. It travels with an acoustical order of speed. One thus observes the action which will initiate the build up of the chain. The actual build up of the activation level may not be observed for some seconds to minutes.

The curve of FIGURE 12 is reversed about the abscissa under certain combinations of geometry and parameters. The same considerations apply to the inverted curve, but an upward curve is preferred. For an inverted curve a high amplitude would still be preferred to a lower amplitude. The acoustical conditions can be changed by changing geometry or the combination of capacitance and voltage of the impulse source so that a rarefaction condition, and hence an inversion of the curve of FIGURE 12, does not take place.

There is an apparent saturation point reached by the top level of activation beyond which further impulses anticipating or following the establishment of the level of activation produce no further activation. However, while no additional Crystal Effect is produced, a Mobility Effect can still be imposed.

While the change from one established level to a higher level can be difficult, there is no difficulty in restoring a level which has begun to anneal. Fewer impulses, or impulses of lower energy level, generally suffice for this purpose. If, for any reason the electrolytic cell is shut down and restarted, it would be necessary to establish the effect ab initio although a partial amount of benefit may remain.

In evaluating the indications explained in FIGURE 12 it can occur that this immediate current charge is negative rather than positive. While experiments do not explain this phenomenon, they do show that activation proceeds from such impulses also. The same consideration applies to firing from point A on the corresponding current lowering curve. Such current lowering is never lasting. No matter what the anode size, it terminates in about one second. The activation may proceed upward from there. The activation may be very gradual for the first few minutes and then rise rapidly for the next 15 minutes. It has been observed that the activation can rise very rapidly, beginning in about three minutes and then reach very nearly its final value in above five minutes. While the experiments do not explain such an operation, it is believed that it is of an acoustical nature rather than of an electrical nature in that the bodies which serve to reinforce the gradient travel through the melt in clusters which are at sonic speeds. As in acoustics, the wave is sometimes reinforced and sometimes upset.

It is possible for a reflected wave to produce a rarefaction which temporarily pulls the ions out of the anodic field. That would depend on the strength of the incident shock front and the geometry of and within the pot. This may be generally remedied by decreasing the size of the storage capacitor and increasing its voltage. Also an excessively long wave or excessive intensity may cause the reflected wave to meet head on and result in sputtering, even though the dielectric limit has not been exceeded.

During the period shown shaded in FIGURE 10B, the magnetic field due to the impulse holds the concentration gradient together thereby enabling there to occur the initial build-up involving ionic, sub-atomic and sub-lattice particles which are now shock dispersed by the follow-through and by their own pressure due to the greater number of excited particles.

It is preferred to have a concentration of about 8% to about 14% aluminum oxide in the bath before undertaking to fire the impulses. It will be found that a higher percentage of alumina i.e. about ½% increment remains in the bath at anode effect when the bath has been activated. It will also be found that an activated cell has less back E.M.F. It is preferred that there be sufficient metallic aluminum in the bath so as not only to saturate that bath prior to activation, but to provide metal for the additional solubility which, in part, the activation produces.

When the storage capacitor precedes a step-down transformer, the equivalent seen by the firing electrodes is capacitance multiplied by the square of the step-down ratio. Thus the 1.1 microfarad storage capacitor 122, referred to above, is the equivalent of 17.6 microfarads at firing voltage. However, the impulse current is higher and the pulse duration is lower than it would be from a capacitor of 17.6 microfarads without transformer 128.

I have also found that an activated mass of cryolite-alumina can be transferred to a pot of fresh cryolite-alumina whereupon the entire pot becomes activated. Thus the necessity of bringing up equipment for the high energy discharges may be confined to a mother pot. After the mother pot is activated, some of its activated content may now be used to seed another pot whereupon the new pot will become activated. The pot which is activated by such transfer may itself be a mother pot. Thus a plant may be erected for the activation of cryolite-alumina, and such activated cryolite-alumina may now be transferred to a reduction plant. Cooling must be avoided and moreover, the transfer must be made at a sufficiently large rate so that the activated material does not become overdiluted.

Figure 15:
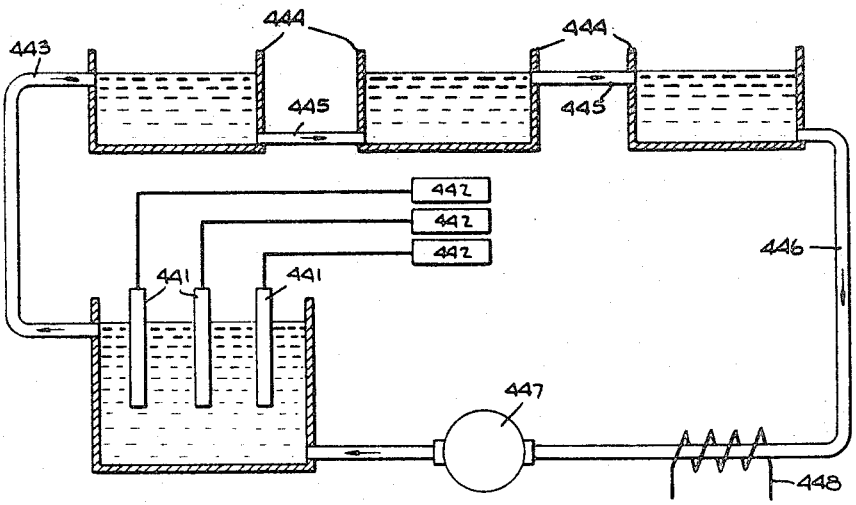
FIGURE 15 is a schematic diagram of a cryolite-alumina activation plant.

An embodiment of a cryolite-alumina activation plant is shown in FIGURE 15. The plant includes mother pot 440 which is adapted to receive a cryolite-alumina mixture which is to be activated. Mother pot 440 is provided with firing electrodes 441 which are connected to high energy impulse source 442. The application of impulses from source 442 to the cryolite-alumina mixture in the mother pot activates the cryolite-alumina mixture therein.

Discharge pipe 443 connects the mother pot to one of pots 444 of the pot line. Pipes 445 serially connect the remainder of pots 444 of the pot line. Return pipe 446 connects the pot line through pump 447 to mother pot 440. Heating means 448 such as an electrical or steam coil heater can be applied to the various pipes in the system in order to maintain the cryolite-alumina mixture in a fused condition.

With this arrangement the mother pot is adapted to deliver a flow of activated cryolite-alumina to the various pots of the pot line. The arrangement can be operated intermittently or continuously in accordance with desired operating conditions. Thus the mother pot can charge the pot line with activated cryolite-alumina and then be shut down or can be left in operation and continue to recirculate activated cryolite-alumina.

Figure 16:
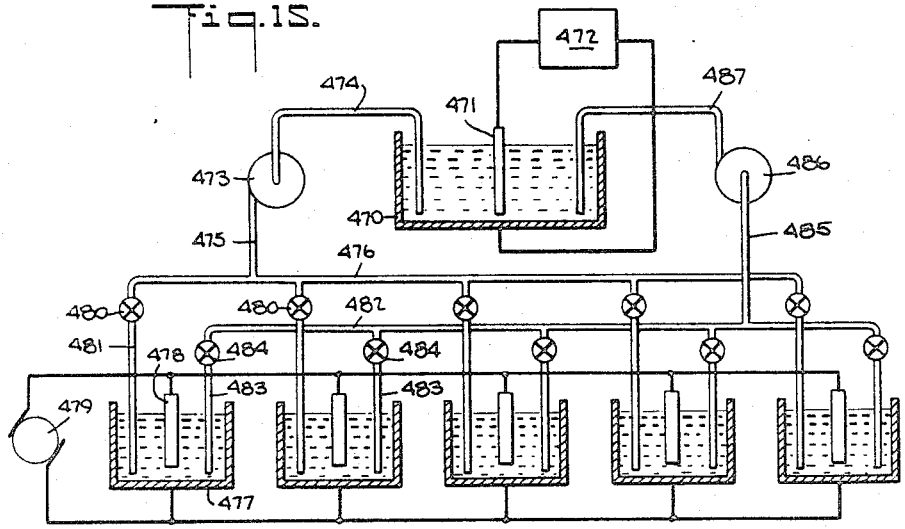
FIGURE 16 is a schematic diagram of an addition embodiment of a cryolite-alumina activation plant.

An additional embodiment of a cryolite activation plant is schematically shown in FIGURE 16. Mother pot 470 is activated through firing anode 471 by high electrical energy pulser 472. Delivery pump 473 transfers the activated cryolite-alumina through pipes 474 and 475 to manifold 476. Each of pots 477 in the pot line are provided with anodes 478 which are connected to low voltage D.C. generator 479. By means of valves 480 and pipes 481, each of pots 477 are adapted to receive the activated cryolite-alumina. Thus mother pot 470 can supply the need of activated cryolite-alumina upon demand to each of the pots in the pot line.

In order to maintain the cryolite-alumina in pots 477 in the activated state during operation of the pot line, mother pot 470 can be adapted to recirculate the cryolite-alumina with respect to pots 477. In a recirculation system each of pots 477 can be connected to manifold 482 by means of pipe 483 and valve 484. Manifold 482 in turn is connected to pipe 485, return pump 486 and pipe 487 leading to mother pot 470.

It can be seen that with valves 480 and 484 in the open position and with pumps 473 and 486 energized, activated cryolite can be delivered to pots 477 and cryolite-alumina can be simultaneously returned from pots 477 for reactivation in mother pot 470. In operation, the recirculation can be conditioned either to maintain a predetermined level of activation in pots 477 or, by intermittent operation to maintain the degree of activation between predetermined limits. Thus the arrangement of the activation plant enables activation to be accomplished with a single set of equipment capable of applying the high energy electrical impulses to the cryolite-alumina.

Impulse timer and firing circuit 31 for initiating and controlling the application of the impulses in accordance with the invention is shown in FIGURE 14. Switch 340 connects the circuit to power source 341. The output of high voltage transformer 342 is rectified by rectifier tube 343. The rectified output of transformer 342 serves to charge capacitor 344 which thereby becomes the source of the impulse which fires the ignitron tube.

Ignitron tube 345 which is serially connected to capacitor 344 and pulse transformer 346 is the switching means which effects the discharge of capacitor 344 through the primary winding of the pulse transformer. The grid of the thyratron is controlled by impulses from tap switch 347 which is connected to power source 348 having a voltage sufficient to fire the thyratron.

Figure 17:
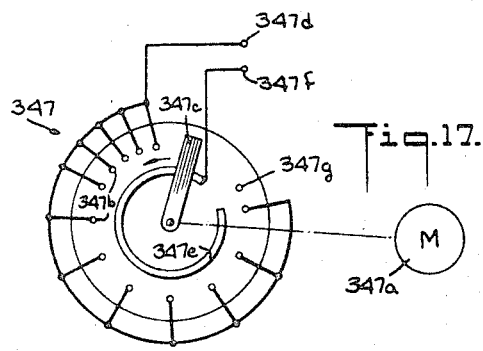
FIGURE 17 is a schematic diagram of an embodiment of the variable top switch shown in the diagram of FIGURE 14.

Tap switch 347 which is shown in FIGURE 17 includes contact arm 347c driven by motor 347a. A plurality of taps 347b are disposed adjacent a circular path of travel of the contact arm. Lead 347d connects the various taps to power source 348. By means of contact ring 347e the switch arm is connected to lead 347f which transmits one or more firing pulses to the grid circuit of thyratron 345. In operation the motor drives the contact arm and moves it with respect to the taps. By spacing the various taps at predetermined intervals with respect to one another the time interval between the firing pulses for the thyratron can be determined. It has been found that the later pulses of a series are more efficiently deployed when the later pulses are fired with a greater interval between them than at the beginning of the series. The repetition rate of the firing impulses to the thyratron can be controlled by controlling the rotational speed at which the motor moves the contact arm. Further variations in the pattern of firing pulses for the thyratron can be obtained by setting the contact arm at various initial positions with respect to the plurality of taps. The switch is also adapted to apply a single firing pulse to the thyratron. In any case the application of firing pulses terminates when the contact arm is driven to tap 347g. Switching means not shown can be employed to deenergize motor 346a whenever it drives the contact arm to a position corresponding to tap 347g.

Upon the application of the firing pulse from the tap switch to the grid of the thyratron, the thyratron becomes conductive and thereby completes the series circuit including capacitor 344 and the primary winding of pulse transformer 346. The surge or pulse of current resulting from the discharge of the capacitor forms a pulse on the secondary of the pulse transformer which is sufficient to fire the ignitor of the ignitron tube connected thereto. Spark gaps 349 are conditioned to limit the magnitude of voltage to be impressed upon the pulse transformer primary winding. Thus it can be seen that the impulse timer and firing circuit provides a completely flexible arrangement which is adapted to apply various series of pulses to fire the ignitron and thereby control the impulses to be applied to the bath.

The crystal disordering pulses are effective to produce increased conductivity even if the low voltage, electrolyzing current is shut off, before, during or after the pushing sequence. Only a temperature sufficiently high to maintain the bath in a fused condition is required. Thus, the melt may be activated in a special activation chamber and subsequently electrolyzed. However aluminum oxide must be present to the extent of at least 2½% and preferably 8% to 10%. It is also preferred that there be available more than about 1.5% metallic aluminum either supplied by seeding or by prior electrolyzation.

Since Crystal Effect pulsing is done only occasionally, the pulse energy requirement is not an appreciable factor as far as the economics of operation is concerned. Within limits, the pulse width can be increased and the voltage lowered (or vice versa). Less total energy is consumed at higher voltages with shorter pulse lengths. Equipment can therefore be smaller and more portable. Separate groups of smaller electrodes 40, 41 (FIGURE 4) made of various conducting, oxidizable, non-melting materials, preferably nickel, nichrome or tungsten can be used to introduce the require pulse to bath 12B.

It will also be convenient to use auxiliary electrodes in one pot in addition to the single pair shown in FIGURE 4; or to connect various auxiliary electrodes from different pots to one pulse circuit 15. With reference to one pot 10B (FIGURE 4), the auxiliary electrode sets (also shown in FIGURE 9B) may be located at one of several parts of the annular spaces; and these may be activated simultaneously or sequentially. The auxiliary electrodes are made to be replaceable; and their firing surfaces are preferably made of nickel or alloys thereof such as nichrome, tungsten or other conducting, nonmelting materials such as platinum or carbon. Optimum results are obtained using auxiliary electrode pairs, the anode portions of which are fabricated of nickel or a nickel alloy. Tungsten is also extremely efficacious, and its oxide sublimes completely, thus avoiding contamination. The ordinary low voltage cathode is preferred as one portion of the firing electrode pair.

Referring to FIGURE 5, a side elevation view, in partial section, of one embodiment of a coaxial pair of auxiliary electrodes is shown. The electrodes thus illustrated are only one embodiment of a very great number which may be used with the apparatus of this invention. The anode 45 is fabricated in preferably a cylindrical form and is made from a copper-tungsten welding alloy, or some other metal which is a good conductor and is heat-resistant. A replaceable nickel or tungsten firing anode 46 is screwed or plugged into the lower end of anode 45. A cathode 47 of preferably hollow cylindrical configuration forms a coaxial sheath for anode 45. Cathode 47 may be made from a variety of metals, for example rhodium-plated stainless steel. The melt should be capable of moving through the gap quite freely.

The annular space between the anode 45 and cathode 47 is filled and tampered with compressed boron nitride powder 48 or some other suitable refractory insulating material. A tapered cathode terminal piece 49 is secured to the bottom of cathode 47. Terminal piece 49 is provided with a central orifice 50 and several slots 51. The insulating material extends to the point 52 where the terminal piece 49 is secured to cathode 47. Terminal piece 49 is detachably secured to cathode 47 at 52 in order to permit retamping of the insulating material 48. The space 53 is filled with fused electrolyte during operation. The electrolyte freely moves into and out of terminal piece 49 through slots 51 and orifice 50. The diameter of orifice 50 should preferably be larger than the diameter of firing anode 46.

Although one embodiment of an auxiliary electrode pair has been illustrated, it is to be understood that many forms of electrodes are contemplated for use in processing an electrolytic cell for the Crystal Effect. Thus, a simple anode rod (not shown) of nickel or other suitable metal may be inserted into the bath 12B; and the bath pulsed using the cell 11B itself as the requisite cathode.

Auxiliary electrode or anode 221 shown in FIGURE 13 comprises nickel-chromium rods 224 supported in boron nitride insulator 222. End portions 224a protrude from the bottom of the insulator. The rods are commonly connected by bar 225 which is attached to rod 225a extending to the source of high energy impulses. By means of adjustable clamp 223 the rods can be progressively lowered with respect to the insulator as they are consumed during operation. In order to protect the upper portion of the rods, insulator 222 is adapted to extend from within the bath to a point appreciably above it.

In order to achieve an optimum increment of increased conductivity, however, it is preferable to use at least one, and probably a plurality of electrode pairs, the number required depending principally upon the shape of the bath and the volume of the fused salt. With a given electrolytic cell, the number of electrode pairs required may be determined with ease. The number of pairs is increased with due regard for economic factors, until optimum conductivity is achieved. The number of electrodes required may also be calculated from purely theoretical considerations.

Avoidance of dielectric breakdown is a controlling factor. The pulses should be in one direction and should be non-oscillatory within the pulsing period as shown in FIGURES 11A and 11B, although subsequent oscillation that is to say reversal, will not have a deleterious effect on the Crystal Effect.

We have observed that a current reversal by reflection will cancel the Mobility Effect, for all practical purposes. It will not affect the Crystal Effect, however. Nevertheless, the reversal by reflection must be kept down, since only the pulse energy which is in phase is effective in producing Crystal Effect. A small amount of reflection can be countered by greater voltage and increased pulse duration, but this cannot be carried too far as the dielectric strength is soon exceeded or the effect is burned out.

At 1000° C. only a small fraction of the lattices are broken down normally, but the remainder are at the threshold of breakdown with prospective greater availability of ionic particles. After pulsing, it appears that the bath attains about eight times as much ionic conductivity. The fehlorder created by the process of this invention diffuses through the melt, releasing ionic particles which can then be electrolyzed at low voltage and can also have their mobilities increased by the Mobility Effect processes of the invention. The new high conductivity equilibrium is attained so rapidly, that the ammeter and voltmeter readings of the low voltage electrolyzing current show the higher conductivity equilibrium within 15 minutes after the completion of the Crystal Effect pulsing. One reason for this is that fehlorder diffusion is rapid. That is, the nuclei of the chain develop throughout the bath in a matter of seconds.

In the processes of this invention, nickel or nickel alloy electrodes are preferable. Tungsten is also very effective, its oxide subliming without contaminating the bath. The crystal disordering and ion mobility pulsing treatments can be combined in the same electro-winning operation. The crystal disordering process provides a larger number of free or available ions, while the ion mobility effect imparts greater mobility to the free ions that exist and orients them in a preferable location with respect to the electrodes. The percentage value of the mobility enhancing effect has been found to be the same in a melt subjected to the crystal disordering treatment as in a melt not so treated, subject to a correction for ion crowding. Co-directional pulses of crystal disordering voltage can be superimposed on the continuous electrolyzing current whereby the Ion Mobility Enhancing Effect would be obtained in addition to the Crystal Effect. This increment of course would be a waste of pulse power, however.

In the performance of the processes according to this invention, the optimal crystal effect pulse voltage, the duration, sequence, pattern and the number of pulses will be determined for each kind of starting material, size and type of treatment, operating temperature and other conditions. Special electrodes are preferably used for crystal disordering, their size, number, sequence of activation, and separation are factors affecting the performance of the overall apparatus. In a Hall-type aluminum electro-winning process, for example, wherein the melt has the conventional composition, and its temperature is maintained at about 1000° C., the crystal disordering treatment in accordance with the present invention may consist of a series of pulses, e.g., from one to ten, preferably six pulses of 3000 volts peak value and 10 microseconds pulse duration. The pulses are fired within a period of from one to twenty, but preferably five seconds in one example. These pulses, modified as described, can be applied across the electrodes used to apply the continuous low D.C. operating voltage to the bath. The operating voltage may thereafter be decreased to less than about 3 volts. The current taken up by the melt has about the same intensity as it would have under otherwise equal conditions at 5 volts in a bath to which no crystal disordering pulses and frequent Mobility Effect pulses are applied. The Crystal Effect pulses should be repeated at long intervals such as every hour, or after there has been a cooling of the melt. The Mobility pulses should be repeated every few seconds. For extremely low level Crystal Effect, intermediate pulses should be repeated every few minutes.

In actual practice, an operator may use a portable 3000 to 5000 volt pulser which is connected to special terminals, insert the terminal pairs in the annular area at the top of the bath and fire a sequence of pulses. He can then move onto the next pot. In this manner, a single pulser can service a large number of pots. If, in addition to the crystal disordering pulses, it is desired to superimpose ion mobility enhancing pulses on the continuous voltage, a 1000 volts pulser preferably connected across the regular low voltage electrode will be provided for this purpose. Auxiliary electrode pairs may also be permanently positioned and fire either through a separate ignitron for each such pair (FIGURE 9B) or through a central ignitron connected to the entire series of electrodes at a common terminal (FIGURE 6). The electrolytic pot line may be series connected as by a coaxial cable to a high voltage generator, such as a van de Graf generator, for the purpose of delivering the pulses through the regular electrodes when the low voltage current is temporarily switched off. This may be accomplished because the Crystal Effect pulsing is effective even in the absence of electrolyzing current.

When the full anode is used for firing the pot, it is likely that a single impulse will be sufficient and thus the repetition rate becomes a matter of hours between impulses. Several impulses may be preferred in a series. They would be spaced at maximum intervals. The larger the firing anode, whether regular or auxiliary, the lower is the repetition rate and the fewer are the number of impulses. Thus an auxiliary firing electrode will require more impulses to a series and more frequent repetition, the smaller it is. The auxiliary anode is preferably 1% to 5% of the area of the total anode although this could vary with a particular pot geometry. Several trials will determine the lowest auxiliary area which is capable of achieving the objective for a specific case. In many cases I prefer to fire by the auxiliary anode. While the total impulse energy will not differ much and the differences will be immaterial in any event, the equipment cost and the practicabilities favor firing with the smallest useable auxiliary anode. On the other hand, for the activation mother plant, the firing electrode may prove quite large in order to provide large portions of activated material which is not overdiluted or quenched by the fresh material but this is acceptable since the equipment is stationary and centralized. Moreover, the large anode may be segmented into sections, insulated from each other, and fired by separate respective banks of condensers (similar to that shown in FIGURE 9B except for the low voltage anode).

*Example I*

FIGURE 11A is a representation of the type of impulse obtained from firing 1.1 microfarads at 20,000 volts through a 4 to 1 step-down transformer to an anode having an effective area of about 0.6 square inch, the pot hitherto being totally unactivated. The pot contained about 700 grams of cryolite, about 60 grams of aluminum oxide, and about 12 grams of metallic aluminum. (As defined above, by the term "cryolite" is meant a composition of halide salts which in the molten state dissolves alumina.) The inductance in the leads, capacitor bank and transformer was about 0.15 $\mu$h. None of the special corrective devices were used. It is seen that the rise time was about 0.3 microsecond. Peak voltage is about 3750 volts. The first reverse voltage is about 1450 volts. A series of these impulses activated the bath and caused a change in its conductivity such that the same current was carried at 3 volts as was originally carried at 5 volts. This represents an average activation level.

In FIGURE 11B is shown an impulse, a series of which was capable of producing a top level of activation, and even more so, of doing so after the previous level had settled in. The storage supply and circuit were the same as in FIGURE 9A, except that the firing was done from an anode having an effective area of only 0.18 square inch. Also, here capacitor 132c was placed across the leads, and its capacity was one-quarter microfarad. Due to previous activation, despite the smaller firing anode, the impulse of FIGURE 11B resulted in 3.4 times the overall conductivity. The peak voltage is similar to that of FIGURE 11A, notwithstanding the change of vertical scale. The rise time is about 0.7 microsecond. The voltage peak is 3600 volts with the first reversal at 1650 volts. The duration of the first quarter cycle in FIGURE 11A is 7 microseconds. The duration of the first quarter cycle of FIGURE 11B is 5.7 microseconds. After the series of impulses of FIGURE 11B, the overall current at 5.0 volts was seven times the previous current. The original current at 5.0 volts was obtained at 1.82 volts. The back E.M.F. was 0.9 volt. The initial back E.M.F. with this anode was 1.5 volts.

*Example II*

A circuit such as the one shown schematically in FIGURE 1 was set up in conjunction with a standard carbon-lined electrolytic pot of the type in use commercially in the well known Hall Process for electro-winning aluminum.

The temperature of the cryolite-alumina bath is maintained at 1000° C. and a steady low D.C. voltage of 5.9 volts and a current of 60,000 amperes is obtained after initial levelling. A high tension pulsed D.C. voltage of 1000 volts peak having the same polarity as the low voltage is superimposed on said low voltage, the high tension voltage comprising 2 pulses per second of approximately one microsecond duration each. Reflected voltage is held to 12% of the original. To maintain the same current level, only 4.7 volts is required, thus effecting about a 20% saving in power, or about a 35% saving in time of production.

Gains of voltage efficiency of the order of from 20 to 50%, averaging 35%, as compared with the conventional Hall Process can be obtained by these repeated, brief, high-voltage D.C. pulses superimposed on the low-voltage operating or carrier current in the same direction as that of the carrier current. The above-described process exemplifies the Mobility Effect. The pulses must be repeated at short intervals during the whole operation, as their effect lasts for a short time. The action of the high voltage Mobility Effect pulses is strongest to the extent that they are co-directional with the carrier current. These co-directional pulses impart additional mobility to the ions in the bath. As stated above, the optimal voltage of the pulses varies with the nature of the bath and with thermal and other conditions. With a bath having a typical Hall Process composition, at an operating temperature of about 1000° C., a pulse voltage of the order of 1000 volts appears to be optimal when the pulse duration or width is about 2 microseconds. Generally, it is preferable to operate at pulse voltages higher than 900 volts. No significant increase of the Mobility Effect is observed at pulse voltages greater than 1000 volts.

It should be pointed out that lithium fluoride may be substituted for sodium fluoride in the melt composition of Example II. In fact, any salt will be operable in the processes of this invention whose electrolytic products reduce as well as dissolve aluminum oxide. The only requirement for the salt is that dielectric breakdown ought not be produced at voltages less than those required to maximize Mobility or Crystal Effect.

*Example III*

In a cell in which the electrolysis of aluminum oxide dissolved in cryolite proceeded normally at a continuous operational voltage of 6 volts and a current intensity of 4.4 amps., the current intensity was raised to 5.4 amps. by a single pulse of 3000 volts lasting 3 microseconds. The current was subsequently increased to 7.2, 8.2, 9.8 and finally to 11.4 amps. by the second to eighth pulses of similar voltage and duration. When the pulses were interrupted the current dropped after one minute to 11 amps. It remained at this level for one hour, then it started decreasing somewhat. The high current intensity could easily be restored by additional pulsing, although not as many pulses were required as initially. Higher amperages of up to 15 amperes were obtained temporarily, but these levels were not steady and the current soon dropped again to the 11 amperes level. The higher current level of 15 amps. exemplified the Mobility Effect superimposed upon the Crystal Effect. The higher current intensity was transitory, compared to the relatively stable 11 amps. level resulting solely from the Crystal Effect.

The aforesaid experimental cell consisted of a graphite container of 30 cc. capacity serving as cathode, having an inner diameter of 30 mm., a height of 45 mm. and a rod-shaped nichrome-type anode reaching down to 1 cm. above the bottom of the cathode. The charge consisted of 35 grams of an alumina-cryolite melt containing approximately 14 of $Al_2O_3$. The back E.M.F. was 1.7 volt at the start of electrolyzing. The melt was maintained at 960° C. The pulse voltage was measured with an oscilloscope at the cell terminals. Penetration of pulse voltage into the low-voltage circuit was prevented by the arrangement of an appropriate inductance in the low voltage circuit. The pulses were supplied by a capacitor of 1 $\mu f.$ capacitance and of low inductance; and were switched through an ignitron tube. The oscilloscope showed a reversal of 30%, i.e. the first peak below the zero line of voltage was 30% as high as the initial voltage peak. The circuit for Example III was the circuit of FIGURE 7 except that rectifier 161 and capacitor 132 were not used. In this particular instance, the situation was actually aided by the addition of a small element of inductance.

Under these experimental conditions, a steady current intensity of about 11 amps. was attained; this could be achieved by six pulses of 3000 volt peak value and about 10 microseconds duration each, following each other at short intervals, e.g. within 5 seconds. (See FIGURE 2.) At lower pulse voltages or larger pot size, a larger number of pulses of greater duration are required for achieving the same level of conductivity. Under the same conditions, the lowest pulse voltage at which a significant and more than transient increase of conductivity could be observed, was 1300 volts; it lasted for some minutes, but, however great the number of pulses, the conductivity did not increase further. At 2500 volts, lasting conductivity corresponding to a current strength of 11 amps. could be achieved with 20 pulses administered within one second. No useful purpose is served by an increase of the pulse voltage above the value at which the highest steady state level of conductivity can be obtained by a small number of pulses, e.g. up to 20. In any case, the dielectric strength of the melt restricts further increases in pulse voltage. The larger the electrode distance and the shorter the duration of the single pulse, the lesser the danger that a discharge through a dielectric breakdown takes place. Thus the electrode distance, pulse duration, number of pulses and pulse voltage can be balanced in mutual dependence so as to obtain the maximum benefit while avoiding dielectric breakdown. At a pulse duration of 100 microseconds, 1500 volts pulses will achieve results; but pulses of 3000 volts at 10 microseconds are five times more economical (see FIGURE 2, for example).

*Example IV*

In subsequent experiments of that series, a large quantity of inductance was added as per FIGURE 8, employing a pulse transformer. In that instance, use was made of 200 microfarads for capacitor 162 and 0.1 microfarad for capacitor 132b which was connected in the primary of the pulse transformer.

*Example V*

Into an experimental pot with inside dimensions 9½" long, 4½" wide and 4½" high, there was placed six pounds of cryolite-alumina. A petroleum coke anode of the same material as is generally used in the industry, 2" x 2" in cross section, was inserted into the cryolite to within 1" from the bottom. The pot was heated from underneath by Globars. Temperature was controlled by a Bristol pyrometer-controller. Fluidity of the cryolite was also checked visually for flow and was stirred with a poker. Temperature was maintained at approximately 980° C. A rectifier delivering the required voltage on a constant basis was connected across pot and anode through a shunt. The shunt was connected to a Bristol recorder as well as to other meters, which in turn were being photographed by a 16 mm. movie camera. The circuit for applying the impulses was substantially in accordance with that of FIGURE 7. The anode was, on its other side, connected to a storage bank of condensers via low inductance leads and a type 7703 ignitron. The condenser bank contained many parallel units totalling 165 μf. and was charged to a nominal value of 4000 volts. This, by oscilloscope measurement, is shown to deliver about 3000 volts between the anode and the pot circuit shown in FIGURE 7, but none of the optionals were used.

As much as 25 pulses were fired without any consequence whatsoever other than mere spikes. Thirty-nine (39) grams of aluminum oxide were then added to the six pounds of the above mixture in order to increase the concentration of alumina to about 1.4%, a concentration still somewhat below that of normal operation conditions. The pulses were repeated again without any effect. Throughout this period, the normal voltage of about 5 volts was maintained and the current showed about 7 amperes per square inch of anode. The pulses were repeated and again without any consequence. The amount of capacity behind the pulses was varied from 15 μf. to 165 μf. There was no consequence other than the previous spikes.

In order to place the pot in a normal operating condition it was necessary to increase the concentration of alumina. Therefore another batch of 39 grams of alumina was added to the pot, making a total of 2.88% of aluminum oxide. A single pulse now fired from a 165 μf. bank, nominally at 4000 volts, activated the pot. Current rose by a factor of more than ten (10), going off scale at this point. Voltage was now brought down to the point where the current was twice the normal amount (the normal is the current observed at 5.1 volts gross and 2.88% alumina in the cryolite mixture). To obtain this new level, the voltage had to be dropped to 2.05 volts. This run was continued for four (4) hours. It resisted extinction during this period although there was 100° drop in temperature for about 15 minutes. The new level was restored on restoration of temperature to 980° C. Also upon a short term restoration towards 5.1 volts, the current again climbed off scale.

The tremendous effect of the pulsing upon the bath is clearly demonstrated by the maintenance of double the current normally accompanying 5.1 volts upon reducing the voltage to 2.05 volts.

*Example VI*

With the apparatus of FIGURE 7 there was used an anode having an effective area of about eight square inches. Various runs established that 15 microfarads under the circumstances could not accomplish Crystal Effect but would accomplish a good Mobility Effect with 15 second total gain after each impulse. After making certain that no activation level would be reached at 15 mf., a single shot was fired from 75 microfarads at 4000 volts, which is about 3000 volts on the electrode. This was followed by a second or third activation level. The pattern was similar to that of Example IV, except that no further shots had to be fired. After one minute the overall cell voltage was set at 1.8 volts, and this now passed 25 amperes. In two minutes more there was 31 amperes; in three minutes more there was 41 amperes; two minutes more there was 57 amperes; two and a half more there was 77 amperes. Cell voltage was raised to 2.9 volts and the current rose to 122 amperes. The pot went into anode effect nine minutes later, bringing the alumina down to 2¼% (¾% more than usual) on the basis of 95%+ current efficiency. Any additional shots had no effect on the current. Then additional alumina was added. The activation situation was restored. After a total of one hour, 2.9 volts gave 110 amperes. The difference between 110 amperes and 122 amperes thirty minutes before is easily accounted for by the anode attrition. In fact the anode attrition is not enough to account for so small a drop, and this fact, together with observations in other cases, indicated that the pot was still in a slightly rising state of activation one hour after activation was begun. The addition of three pounds of fresh cryolite mixture to the six pounds of activated material resulted in the entire pot becoming activated to approximately the same level. Reversal was 38% (165 μf.). This example illustrates firing from the full low voltage anode. It also illustrates that the chain carries on into substantial additions of new material. The subsequent addition of 50% fresh cryolite took on the same level of activation without further impulses.

*Example VII*

This example illustrates the action of the circuit of FIGURE 9A. Electrode 140 was in four segments (FIGURE 13) containing Ni–80% Cr—20%. The four segments were connected to a single transformer, transformer 128. Anodes 113 were separately metered by a pair of recording ammeters 167 in order to observe the activation buildup from different locations. It should be observed here that the activation was produced with 15 microfarads on the same quantity of cryolite as in Example V. However, many more impulses were fired before it could be observed that the highest or any level of activation was reached. The auxiliary was a very small anode of 0.2 square inch, which was adjusted for a side current equivalent to about 0.3 square inch. With this size anode and a 15 microfarad storage capacitor, the firing rate was two per second. Here it should be noted that the firing rate goes down with increase of firing anode area. Eight discharges were fired before even stopping to observe the effect and, of course, there could not be much observation of the effect on the low volt anodes of eight square inches each in the four seconds. It was determined that the current in the nearer anode started to climb sooner than the current in the distant anode. This initial rise does not represent the activation level but rather the spread of nuclei of the chain reaction. The shock front did not carry very far. The chain reaction started to build up at the nearer anode but diffusion of the chain proceeded with only a small time delay. In the final plateau, there was no delay at all as between anodes. After several minutes both anodes operated at about 120 amperes per anode having increase from about 70 amperes per anode. The operating condition then rose to about 1200 amperes per anode almost simultaneously on both meters. The principal approach from 120 amperes to about 1080 amperes for each anode occurred about one minute apart, the nearer anode being first. They both reached 1200 amperes and held 1200 amperes simultaneously. The time for the total rise to this level from the initiation of pulses was nine minutes. The distant anode lagged by a few minutes at the 120 ampere level. Each of the low voltage anodes had an effective area of about eight square inches. Eight pounds of cryolite of 4% aluminum oxide were in the bath. Eight shots at the rate of two per second were made with a ⅜" gap. Resistor 168 (as shown in FIGURE 8) was .015 ohm. The reversal was 60% and the rise time was 0.4 microsecond. The pot was silicon nitride with graphite cathode and end walls set into it.

*Example VIII*

A single anode of five square inches was used in a bath containing six pounds of cryolite. In this example firing was done from the low voltage carbon anode by means of a 1.1 microfarad bank. The charge was 20,000 volts which was fed step-down by a ratio 4 to 1. Resistor 168 had a value of .04 ohm. The pot was first run normally with this same anode at five volts. It showed initial current of 120 amperes, quickly polarizing to 110 amperes.

In two hours of running, it was determined that about one half the current was not producing aluminum and that the cryolite was being lost. With fresh cryolite and the same anode, now somewhat attenuated, a stable current of 55 amperes was obtained. A single shot was fired from the 20,000 volt bank. Current climbed to 202 amperes in five minutes. It was determined that all of the activation current was producing aluminum, i.e. the whole 202 amperes.

*Example IX*

Tests have demonstrated that an excessively long shot will burn out the effect. It showed on a quantitative basis the use of a small value in 132$b$, FIGURE 8. It showed that 700 grams of cryolite could be activated with 1.1 $\mu$f. at 20,000 volts, stepped down 4 to 1 by transformer 28. The firing anode area was about 0.2 square inch. The initial current was 16 amperes at a low voltage tungsten anode which was also used for firing. Ten shots at one per second with capacitor 132$b$ at zero raised the current to 31 amperes. This was given time to establish its plateau, Firing again with capacitor 132 at ¼ microfarad raised the level to 38 amperes. Fifteen minutes later the pot was fired again with capacitor 132$b$ at ¾ microfarad and the current increased eventually to 110 amperes from a normal of 16 amperes. This example primarily shows that by compressing energy of the discharge into an overall smaller period of time and by improving impulse shape with respect to power factor and peak duration, it is possible to leave an established activation plateau and go to a higher activation level. This is not to say however, that the compression of impulse energy per unit of time cannot be overdone.

*Example X*

In this experiment, a similar but smaller anode than the one of Example IX was fired from a 78 microfarad bank without the step-down transformer. This resulted in a first level activation. This was improved to about a second level activation with a value of ½ microfarad for capacitor 132. The gross voltage 4000 volts impressed about 3000 volts at the electrodes. However, the voltage obtained on attempting to go to a still higher level of activation rose to 3750. Also, the reversal when from 32% to 22% showing that the conductivity burned out. This and other observations indicate that a storage capacitor of excessive size in relation to the anode area can burn out the gradient. In Example X, the gradient was not utterly destroyed, but it was damaged more than it was helped by the excessive storage capacitor. The large capacity of the source served to improve the power factor, but once activation has set in, the percentage reversal should become greater. Part of the low reversal compared with that of Example IX is due to the larger storage capacitor 22 and its longer discharge period.

*Example of the emperical selection of parameters*

There are some eight primary interdependent parameters. The ultimate refinement is best done experimentally. The following steps will determine the order of magnitude.

(1) Select the anode area. For example, the regular total carbon anode area is 10,000 square inches. Use either a carbon anode (one of the 40 or so prebakes) of 250 square inches or use a tungsten anode of 50 square inches.

(2) If the anode is of tungsten, divide into a number of segments as shown either in FIGURE 13 or 9B.

(3) Select a capacitor bank. For the carbon anode this may be 5000 $\mu$f., delivering a 2500 volts impulse to the anode. It may be necessary to change this to as much as 25,000 volts in order to have 2500 volts at the anode after series resistance and inductance losses. For the tungsten anode select 1000 $\mu$f., delivering 5000 volts at the firing anode.

(4) For the carbon firing anode try the normal gap. For the tungsten firing anode try about one-fourth the normal gap. In either case the normal cathode is the high voltage cathode. The impulse is applied with a crowbar circuit or impulse rectifier.

(5) Attach about a one-half microfarad capacitor across the foils leading to the firing electrode and vary the capacitor until the current still lags and the first reversal is about 30% of the first peak.

(6) For the carbon anode start with a repetition rate of about one per minute. For the tungsten anode, start with a repetition rate of about 10 per minute. Observe the effect on the low voltage meter and determine whether to increase or decrease the interval. Ultimately refine to the variable repetition rate.

(7) Initially terminate after 30 impulses. Eventually predetermine the best pattern of repetition and termination.

(8) The peak pulse duration in the case of tungsten is from 1 microsecond to 3 microseconds and the overall impulse length to the point of first reversal is about 100 microseconds. In the case of the carbon anode, the peak impulse duration is from 4 to 12 microseconds and the overall impulse is about 500 microseconds.

(9) If the capacitor bank is increased and the trend of activation is less satisfactory, there may be some burnout due to excessive length and strength. Try less capacity. If greater length and strength is required, chop the impulse.

*Summary*

Method and means have been shown for the activation of a fused salt used in the electro-winning of metals. The nature of the bath is changed by this processing so that more ions are available and so that a greater quantity of aluminum and of aluminum oxide forms a part of the molecule or lattice. It has been found that this also gives carbon anodes a greater depolarizing value. Added ion availability is extinguished by chilling but the anode wetting and other depolarization enhancement features remain subject in part to the thermal history of the chilling. This is well defined by a lowering of the back E.M.F. and residual conductivity enhancement of the remelt.

The most unique feature of this invention is that after an application of electrical energy, as herein described, a chain reaction is initiated which does not require, at least for a substantial period, any further application of the same high energy impulses. Electrical impulses have been used for other purposes in connection with electrolytic baths but there is no prior process wherein the application of such impulses can be discontinued and the benefit thereof still remain for a substantial period of time.

It has been demonstrated that the formation of the activation as well as its maintenance by chain reaction derives its principal energy from the heat of the melt. The initial formation of activation has been found to draw sufficient heat from the bath to lower its temperature by 10 degrees. Of course, the bath is made sufficiently hot so that it will not be chilled in the course of activation. The maintenance of the chain requires very little energy and does not materially affect the heat balance.

The high energy pulsing sets up a concentration gradient of excitons. This is shock blasted into the melt by the collapse of the containing magnetic field. Nucleation centers form in the vicinity of the firing anode. They spread more slowly. Meanwhile the chain reaction builds up, usually requiring 5 to 15 minutes for the greater portion of its development and the higher the ultimate level, the longer the development period. The shock front travels with acoustical speed as shown by the unidirectional impulse period in relation to firing anode radius of about 30 microseconds per inch. Other acoustic phenomena are exhibited.

It has been shown that in the activated melt carbon anodes are capable of carrying heavier current densities without loss of current efficiency. Indeed, there is more current efficiency.

There is less carbon anode consumption. It is possible to maintain the original heat balance, nonetheless, by utilizing the benefit of the invention so as to increase the operating rate as well as to lower the voltage.

The concept of different activation levels is set forth. Moreover, it is shown that an impulse system can be predetermined to arrive at an advance level. It is also shown that the level can be changed by further impulses. However, meeting the lower resistance due to a prior activation level is a different problem from meeting the lower resistance of a larger firing anode. In the case of a larger firing anode it is recommended to use a capacitor storage which is more than sufficient to maintain the time constant, due to the fact that with a larger radius the concentration gradient must travel a longer distance and it travels approximately with the speed of sound. A longer time constant reduces the problem of matching the lower resistance.

It has been shown that the crystal effect, i.e. the activation, can be achieved by firing from an anode which is smaller or which is only a part of the regular lower voltage anode system. Indeed, it is preferred to fire with a ratio of 1% to 5% of the ordinary anode area. The smaller the auxiliary anode, the higher the peak voltage, the more frequent the repetition rate in a given series, and the longer the series. This carries to the point that when the firing anode is the total ordinary anode, a single impulse of voltage in the lower portion of the permissible range and the correspondingly long duration such as 30 microseconds per inch of radius is sufficient for the entire series.

There are eight primary factors in the Crystal Effect pulsing of a pot of given size of geometry the criteria of which are established. The factors are interrelated. They are firing anode area, storage capacitor, impulse power factor, impulse repetition rate, number of impulses per series, peak voltage, duration of peak voltage, and duration of impulse. Additional means are shown which involve a reshaping of these impulses. The characteristic here summarized remain dominant.

It has been shown that there is a range with a high energy impulse threshold on the one hand and upper limits on the other hand. Exceeding the upper limit of voltage results in a useless electronic avalanche. Exceeding the combination of peak voltage, peak current, duration of peak, duration of impulse, and the repetition rate can result in a burnout of such activation as may have begun.

Repetition rate is keyed to the phenomena of FIGURE 12. Its upper limit from the burnout standpoint is a function of the firing anode size. The larger firing anode requires and tolerates a lower repetition rate. The larger firing anode also does not require as large a number of impulses in an activation series.

Within the range, peak voltage is higher when the peak duration is shorter and the anode area is smaller. Conversely, with a large anode, intermediate peak voltage is found to be as good or better than a higher peak voltage.

Mobility is established as a factor which can be influenced by external means, i.e. co-directional impulses. For this purpose the high energy impulses are still a matter of energy, that is high power factor, but the overall value and duration is much lower. A potential of 1000 volts and a 1 microsecond duration at the peak is sufficient for the largest firing anode. The impulse duration following the peak is in this instance not necessary from the standpoint of shock dispersing a gradient. Impulses are terminated as rapidly as possible following the peak region. No concentration gradient need be established for Mobility Effect and excessively heavy impulses should be avoided because of the risk of burnout of the Crystal Effect. A range is available which produces temporary benefits but is inadequate Crystal Effect pulsing rather than Mobility Effect. Such a range can be utilized by consistent repetition every few minutes or as often as necessary.

The steady power demand for the high energy impulses remains about the same in order of magnitude no matter what proportion of firing anode is used and also irrespective of the size of the pot to be fired. With a large enough pot and a large enough firing anode, the condenser bank may have more than a minute to attain its charge. With a 5% anode area it would have about two seconds in which to attain its charge. However, with a larger firing anode a larger storage bank would be required. But, it is fired less often as well as fewer times per series.

It has been found that the inductance must be held to a value corresponding to the low resistance between the firing anode and the cathode. It has also been found that a net quantity of inductive reactance is desirable. Means and method are shown for working into the very low resistance which characterize large electrode areas in fused salts.

It is shown that the melt can be activated independently of the low voltage reduction process (this is not the case for Mobility Effect). An advantage is that the cryolite-alumina for an entire plant can be activated in a central activation pot wherein no reduction anodes at all need be employed.

A system is shown for segmenting a large firing anode such as might be used for an activation center. In this case segments are combined to form a large area but the segments are electrically insulated so that they can be fired from respective storage banks inductive or capacitive, by means of switches and so forth. It is not material to the process whether all the segments are fired from a single source or through a single switch or a single combined inductance, but as a practical matter it will be found desirable to use smaller condenser banks, smaller switches and larger inductances joined to a small insulated segment of firing anode, all the segments being triggered substantially simultaneously.

Means are shown for triggering the impulses at a variable repetition rate and for predetermining the number of impulses. It has been found that the interval between impulses can be made larger as the series progresses. Thus if 5 second intervals between impulses are used in the early part of a 20 impulse series, 10 seconds may be used as the interval for the 12th impulse and 20 seconds as the interval between the last impulses.

It is found that when firing is to be done into an already activated melt it is better to shorten the impulse per given quantity of impulse energy. This can be done by the use of a high voltage which has been stepped down to the working voltage.

The upper voltage in the case of cryolite alumina is about 5000 volts. This upper limit will vary somewhat with temperature being lower for a high temperature, with gap length being lower for a shorter gap, and with peak voltage duration. The principal criteria in utilizing this invention for other fused salt oxide compositions hinges substantially on the temperature of operation. The minimal activation voltage increases as the temperature goes down, but the breakdown voltage may not increase to the same extent.

An auxiliary anode system is preferred for activation because of the ability to employ it with a smaller gap length. It is also preferred because of the ability to make it from special materials such as tungsten and compositions of nickel. In case of Mobility Effect it is preferred to do the firing from the main reduction anode.

The concentration gradient must be formed in sufficient volume so that it is not excessively overwhelmed upon being released into the bath by the collapse of the containing magnetic field, more specifically the magnetic field which exists during time of peak energy. Thus there is a limit to the smallness of the firing anode for a given size and geometry of the pot to be activated.

It has been found that acoustical effects also condition the low voltage pattern of FIGURE 12 immediately following the release of the concentration gradient. Depending upon how the acoustical reflections occur and whether they supplement, counter, or deploy into a rarefaction will effect the shape of the curves shown in FIGURE 12, as well as the efficiency of the activation processing. Geometric changes and changes in the capacitor voltage relationship can be deployed to produce a preferred condition in which the acoustical waves of concentration gradient supplement each other.

It has been found that the activation process but not Mobility Effect results in a lowering of the back E.M.F. A lowering of the back E.M.F. of as much as 40% has been found, but such large lowering is not consistent. A 20 to 30% lowering is usual.

The chain reaction herein produced reaches into the addition of fresh material provided only that the fresh material is not added in such overwhelming quantity as to overdilute or quench out the chain reaction, and provided also that if the amount of fresh material is extremely large, it is preheated so as not to chill the melt.

It is found that the activated melt dissolves more of the metal as shown by deeper color at fast chilling and it dissolves more oxide as shown by the greater percentage of oxide remaining at anode effect.

The activation survives anode effect. The addtion of oxide which ordinarily restores the bath to its normal electro-winning of metals condition also does so without attenuation of the activation.

A novel type of chain reaction is herein produced. It is consistent with the concept that a cryolite-alumina bath contains a large supply of residual crystals in which the ions remain interlocked and unavailable. It shows consistency with the Schottke-Wagner theory of vacancy transfer in such crystals. The low energy deployed for initiating and maintaining the Crystal Effect is consistent with the concept that the percentage of vacancies and hence of available ions in the melt is a very small portion such as .01% of the total ionic quantity. This small percentage is increased by the Crystal Effect portion of this invention to a much higher percentage but this is still a very small one such as 0.1%. The prior beliefs that millions of volts would be required to disrupt the crystals are therefore not invalid per se. It is only that it is not necessary to disrupt the entire crystal in order to obtain industrial benefits to the point where the efficiency is almost as high as the thermodynamics will allow.

What is claimed:

1. The process of activating a melt of cryolite-alumina in order to increase the conductivity of an electrolytic cell when the melt is disposed therein comprising the step of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, said range of peak voltages of said impulse extending from about 1000 to about 5000 volts with the respective minimum time duration of said peak voltage being in the range of about 25 microseconds to about one microsecond.

2. The process of activating a melt of cryolite-alumina in order to increase the conductivity of an electrolytic cell when the melt is disposed therein comprising the steps of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, said range of peak voltages of said impulse extending from about 1000 to about 5000 volts with the respective minimum time duration of said peak voltage being in the range of about 25 microseconds to about one microsecond, and after a period of activation of additionally applying to the melt a finite series of at least one impulse corresponding to said impulse to maintain an increase in the conductivity of the cell.

3. The process of activating a melt of cryolite-alumina in order to increase the conductivity of an electrolytic cell when the melt is disposed therein comprising the step of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, said range of peak voltages of said impulse extending from about 1000 to about 5000 volts.

4. The process of activating a melt of cryolite-alumina in order to increase the conductivity of an electrolytic cell when the melt is disposed therein, the cell having a low voltage anode and a firing electrode with an area smaller than that of said low voltage anode, comprising the step of applying a finite series of at least one impulse of high energy to the melt by means of the firing electrode, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt.

5. The process of activating a melt of a fused salt in order to increase the yield of metal per kilowatt-hour for a given rate of production of an electrolytic cell for the electrowinning of aluminum when the activated melt is electrolyzed in the cell comprising the steps of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, and additionally applying to the melt a finite series of at least one impulse corresponding to said impulse to the melt prior to the cessation of the increase of the conductivity of the cell produced by said one impulse.

6. The process of activating a melt of cryolite-alumina in order to increase the conductivity of an electrolytic cell when the melt is disposed therein comprising the steps of applying a series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, and cutting off said impulse after a predetermined minimum time duration being in a range related to the peak voltage, thereby enabling high voltage to be applied for said predetermined period and subsequently reducing the high voltage to prevent the possibility of the destruction of the activating of the melt by the application of an excessive quantity of energy to the cell.

7. The process of activating a melt of a fused salt containing alumina in order to increase the conductivity of an electrolytic cell when the melt is disposed therein comprising the steps of dissolving alumina in the melt in order to establish a ratio of alumina at least sufficient for normal reduction conductivity, said ratio being from about 2% to about 20% by weight of the fused salt therein and applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt.

8. The process of activating a melt of a fused salt containing alumina and aluminum in order to increase the yield of metal per kilowatt-hour for a given rate of production of an electrolytic cell when the melt is disposed therein comprising the steps of dissolving in the melt aluminum oxide to the extent thereof at least sufficient for normal reduction conductivity, dissolving an excess of aluminum in the melt, and applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt.

9. The process of activating a melt of a fused salt in order to increase the yield of metal per kilowatt-hour for a given rate of production of an electrolytic cell for the electrowinning of aluminum when the activated melt is electrolyzed in the cell comprising the step of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, the impulses of said series having a repetition rate in the range between a repetition rate sufficient to enable succeeding impulses to augment prior impulses and a repetition rate at which at least a partial burn-out of the activating of the melt is produced.

10. The process of activating a melt of a fused salt in order to increase the yield of metal per kilowatt-hour for a given rate of production of an electrolytic cell for the electrowinning of aluminum when the activated melt is electrolyzed in the cell comprising the step of applying a finite series of at least one impulse of high energy to the melt by means of an anode disposed therein, said said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, the impulses of said series having a repetition rate in the range between a repetition rate sufficient to enable succeeding impulses to augment prior impulses and a repetition rate at which at least a partial burn-out of the activating of the melt is produced, the repetition rate being an inverse function of the impulse duration, the impulse energy, and the total size of the anodes by means of which the series is applied to the melt.

11. The process of activating a melt of a fused salt in order to increase the yield of metal per kilowatt hour for a given rate of production of an electrolytic cell for the electrowinning of aluminum when the activated melt is electrolyzed in the cell comprising the step of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, the impulses of said series having a repetition rate in the range of about 25 impulses per second to about one impulse per minute, the impulses of said series having a repetition rate in the range between a repetition rate sufficient to enable succeeding impulses to augment prior impulses and a repetition rate at which at least a partial burn-out of the activating of the melt is produced.

12. The process of activating a melt of a fused salt in order to increase the yield of metal per kilowatt-hour for a given rate of production of an electrolytic cell for the electrowinning of aluminum when the activated melt is electrolyzed in the cell comprising the step of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, the number of impulses in said series being in the range between a number sufficient to enable succeeding impulses to augment prior impulses and a number at which at least a partial burn-out of the activating of the melt is produced.

13. The process of counteracting the effect of non-wetting intermediate compounds at the interface of the anode of an electrolytic cell and a fused salt solution of alumina containing dissolved aluminum therein in order to increase the productivity of the electrolytic cell when the melt is disposed therein, the cell having a low voltage anode, comprising the steps of activating the melt by applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, said activating increasing the quantity of dissolved aluminum in the melt thereby counteracting the effect of the non-wetting intermediate compounds on the interface of the anode.

14. The process of activating a melt of a fused salt solution of alumina in order to increase the conductivity of an electrolytic cell when the melt is disposed therein comprising the step of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, the repetition rate of the impulses of said series decreasing as the series proceeds, said repetition rate being in the range between the repetition rate sufficient to enable succeeding impulses to augment prior impulses and a repetition rate at which at least a partial burn-out of the activating of the melt is produced.

15. The process of activating a pot containing cryolite and alumina in order to increase the conductivity of an electrolytic pot when the melt is disposed therein comprising the steps of temporarily increasing the temperature of the melt and of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, whereupon the temporary loss of temperature due to the activating reactions has been mitigated.

16. The process of activating a melt of cryolite and alumina in order to increase the conductivity of an electrolytic cell when the melt is disposed therein, the cell having divided into segments insulated from one another, comprising the step of applying impulses of high energy to the melt in parallel from at least a portion of the segments, at least a portion of said impulses having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt whereby a single concentration gradient is formed by the impulses at the segments.

17. The process of activating a melt containing cryolite and alumina in order to increase the power efficiency of an electrolytic cell when the melt is disposed therein comprising the step of applying a series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt said impulse having a reversal portion extending less than 65% of its initial peak portion.

18. The process of activating a melt of a fused salt in order to increase the yield of metal per kilowatt-hour for a given rate of production of an electrolytic cell for the electrowinning of aluminum when the activated melt is electrolyzed in the cell, said melt being adjacent a firing anode, comprising the steps of capacitatively storing electrical energy in a circuit connected to the firing anode and applying a series of at least one impulse of the stored electrical energy to the melt by means of said firing anode, said impulse being shaped to have a peak voltage in a range extending from a peak voltage at least equal to the miniumum voltage required to produce an increase in the conductivity of the cell which persists at least in part after the applying of said impulse to a peak voltage less than the minimum voltage required to produce disruption of the melt, the capacitance of said stored energy and the pulse shaping characteristics of said circuit conditioning the first quarter cycle of the applied impulse to endure less than 50 microseconds for each inch of firing anode radius.

19. The process of activating a melt of a fused salt in order to increase the yield of metal per kilowatt-hour for a given rate of production of an electrolytic cell for the electrowinning of aluminum when the activated melt is electrolyzed in the cell comprising the steps of activating a melt of a fused salt by applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, and adding a quantity of a salt corresponding to said fused salt to the activated melt, said quantity of said salt thereby becoming activated.

20. The process of activating a melt of a fused salt in order to increase the yield of metal per kilowatt-hour for a given rate of production of an electrolytic cell for the electrowinning of aluminum when the activated melt is electrolyzed in the cell comprising the step of applying a series of at least one rectified impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, whereby the activating capability of the rectified impulse can be increased without correspondingly producing a disrupting effect of the impulse upon the activation.

21. The process of activating a melt containing cryolite and alumina in order to increase the conductivity of an electrolytic cell when the melt is disposed therein comprising the step of applying a finite series of at least one impulse of high energy to the melt, said impulse being partially blocked and having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt.

22. The process of improving the efficiency of a fused salt electrolytic cell having a melt containing alumina for the reduction thereof comprising the step of applying a predetermined series of underdamped impulses of high energy to the melt, said impulses having a peak voltage in a range extending from a peak voltage at least equal to the minimum voltage required to produce an increase in the conductivity of the cell which persists at least in part after the applying of said impulses to a peak voltage less than the minimum voltage required to produce dielectric breakdown of the melt.

23. The process of activating a melt of a fused salt in order to increase the yield of metal per kilowatt-hour for a given rate of production of an electrolytic cell for the electrowinning of aluminum when the activated melt is electrolyzed in the cell comprising the steps of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, establishing a concentration gradient in the melt in response to the application of said impulse and adjacent to the location therein of the application of said impulse, and permitting said concentration gradient to develop in order to start nucleation toward an activated condition of the melt.

24. The process of activating a melt containing alumina dissolved in a cryolite type of mixture in order to increase the conductivity of an electrolytic cell when the melt is disposed therein comprising the steps of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, and permitting the cell to develop a higher level of conductivity for a period of approximately 15 minutes following the application of said high energy impulse.

25. The process of elevating a melt of cryolite-alumina from one level of activation to a higher level of activation in order to increase the conductivity of an electrolytic cell when the melt is disposed therein comprising the step of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt.

26. The process of elevating the level of activation of a melt of cryolite-alumina to a higher level of activation in order to increase the conductivity of an electrolytic cell when the melt is disposed therein comprising the steps of connecting a source of at least one high energy impulse to the load presented by the melt, the source being matched to the load to an extent resulting in a slight excess of inductance in the source, and applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt.

27. The process of activating a melt containing alumina dissolved in a mixture containing halide salts in order to increase the conductivity of an electrolytic cell when the melt is disposed therein comprising the step of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt.

28. The process of activating a melt in which alumina is dissolved and which is disposed in a cell having at least one electrolyzing anode and at least one firing electrode, the melt being activated in order to increase the power efficiency of the cell, the combined area of said firing electrodes being in the range from about .2% to about 10% of the total area of the electrolyzing anodes, comprising the step of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt.

29. The process of activating a melt of a fused salt in order to increase the yield of metal per kilowatt-hour for a given rate of production of an electrolytic cell for the electrowinning of aluminum when the activated melt is electrolyzed in the cell comprising the step of applying a finite series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, the first quarter cycle portion of said impulse containing more than about 10% of the total energy of said impulse.

30. The process of activating a melt in which is dissolved alumina for the electrolytic reduction thereof in order to increase the conductivity of an electrolytic cell when the melt is disposed therein comprising the step of applying a finite series of at least one impulse of high energy and of fast rise time to the melt, said impulse having a peak voltage in a range extending from a peak voltage at least equal to the minimum voltage required to produce an increase in the conductivity of the cell which persists at least in part after the applying of said impulses to a peak voltage less than the minimum voltage required to produce dielectric breakdown of the melt.

31. The process of activating a melt containing alumina and at least one halide salt in order to increase the conductivity of an electrolytic cell when the melt is disposed therein comprising the step of applying a series of at least one impulse of high energy and of a rise time less than about 3 microseconds to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt.

32. The process of activating a fused salt melt containing alumina for the electrolytic reduction thereof in order to increase the conductivity of an electrolytic cell when the melt is disposed therein comprising the step of applying a finite series of impulses of high energy to the melt by means of an anode disposed adjacent thereto, each of said impulses providing an energy density in the range of about 100 to about 500 joules per square inch of the anode by means of which the impulse is applied, each of said impulses having a voltage in the range of about 1000 to about 5000 volts, having a power factor of more than about 50%, and having a first quarter cycle duration of less than about 50 microseconds per inch of radius of the anode by means of which the impulse is applied.

33. Apparatus for activating a melt of fused salt containing alumina in order to increase the conductivity of an electrolytic cell when the melt is disposed therein comprising means for containing the melt, a source for producing a series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, a firing electrode extending into said containing means for applying said impulse to the melt, and means for connecting said source to said firing electrode, the impedance of said source and said connecting means being in the range of the order of magnitude of the impedance presented by said firing electrode at the load.

34. Apparatus for activating a melt of fused salt containing alumina in order to increase the conductivity of the melt comprising a cell adapted to receive the melt to be activated, a source for producing a series of at least one impulse of high energy connected to said cell, said impulse having a peak volage at the discharge zone in said cell in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, and means connecting said source to said cell for conditioning said impulse to be applied to the melt, said conditioning means delivering to said cell a high power impulse of relatively brief duration for an initial period and of reduced impulse power for a subsequent period, thereby limiting the energy applied to the cell beneath a destructive level.

35. The composition of activated cryolite comprising cryolite having aluminum atoms integrated therein in excess of the solubility of aluminum atoms integrated in the cryolite of the kind used in a Hall type melt, said excess of aluminum atoms in the cryolite resulting from the activation thereof by the application of a series of at least one impulse of high energy to the cryolite while in the molten state, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt.

36. Apparatus for activating a fused salt melt containing alumina comprising an electrolytic cell having electrolyzing and activating anodes comprising a source for producing a finite series of at least one high energy impulse, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, said activating anode being connected to said source for applying a finite series of at least one impulse of high energy to the melt, said activating anodes having a total area which is less than the total electrolyzing area.

37. Apparatus for activating a Hall type melt comprising an electrolytic cell for containing the melt and having a carbon anode for reduction, a source for producing at least one high energy impulse, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, and at least one pair of firing electrodes for the melt disposed in and spaced from said cell, said firing electrodes being connected across said source for applying at least one impulse of high energy to the melt.

38. Apparatus for activating a Hall type melt in order to increase the conductivity of an electrolytic cell when the melt is disposed therein comprising a firing electrode, said firing electrode being divided into segments which are spaced adjacent to and insulated from each other, a plurality of sources for producing a series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, and means for switching said sources into circuit with the segments of said firing anode.

39. Apparatus for activating a fused salt melt containing alumina in order to increase the transfer conductivity of an electrolytic cell when the melt is disposed therein comprising a source for producing a finite series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, said source having capacitance means for storing the high energy, a firing electrode, a circuit for connecting said firing electrode to said source, means for discharging the high energy stored in said capacitance means through said firing electrode, and means for conditioning the combination of resistance, capacitance, and inductance of said connecting means to enable the discharge of said capacitance means to rise rapidly and to be underdamped so as to tend toward a reversal in the anode, said reversal having an amplitude less than about 65% of the corresponding preceding amplitude.

40. Apparatus for activating a melt of cryolite-alumina in order to increase the productivity of an electrolytic cell when the melt is disposed therein comprising a firing electrode; a circuit including a source for producing a finite series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, and means for connecting said source to said firing anode to apply said impulse to the melt; and means for conditioning said circuit to enable the duration of the first quarter cycle of said impulse to be less than about 50 microseconds for each inch of the radius of said firing anode.

41. Apparatus for activating a Hall type melt in order to increase the conductivity of an electrolytic cell when the melt is disposed therein comprising a source for producing a series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, and a firing electrode, a circuit for connecting said firing electrode to said source for applying said impulse to the melt, said source having capacitance in the range of about 6 microfarads to about 50 microfarads per square inch of discharge area of said firing electrode, said range of capacitance being reduced in the proportion by which the impedance of said circuit connecting said firing electrode exceeds the impedance of its discharge zone, and the voltage applied to said capacitance being selected to compensate for the loss of voltage in said additional impedance.

42. Apparatus for activating a Hall type melt in order to increase the conductivity of an electrolytic cell when the melt is disposed therein comprising an energy storage source for producing a series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, and at least one firing electrode connected to said source for applying said impulse to the melt, said source having a quantity of stored energy determined as a direct function of the combined area of said firing electrode.

43. Apparatus for activating a melt of cryolite-alumina in order to increase the conductivity of an electrolytic cell when the melt is disposed therein comprising a source for producing a finite series of at least one high energy impulse and pulse transformer means for coupling said source to the melt, the impulse to be applied to the melt having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt.

44. Apparatus for activating a Hall type melt in order to increase the conductivity of an electrolytic cell when the melt is disposed therein comprising a source for producing a series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, means for connecting said source to the melt, and capacitance means connected to said connecting means for correcting the inductance in said connecting means to increase the activating energy of the peak portion of said impulse, the impulse power factor thereby being improved.

45. Apparatus for activating a fused salt melt containing alumina in order to increase the conductivity of an electrolytic cell when the melt is disposed therein comprising a source for producing a finite series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, means for connecting said source to the cell, and impedance means connected to said connecting means for improving the power factor of said impulse.

46. Apparatus for activating a melt of cryolite-alumina in order to increase the conductivity of an electrolytic cell when the melt is disposed therein comprising a source for producing a finite series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, said source including capacitance means for storing the high energy and crowbar cut-off means, said capacitance means and said cut-off means conditioning said impulse to have a wave form with high initial energy, high power factor, and short overall duration; and means for connecting said source to the melt to apply said impulse thereto.

47. Apparatus for activating a melt of cryolite-alumina in order to increase the conductivity of an electrolytic cell when the melt is disposed therein comprising a source for producing a finite series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, said source including means for storing the high energy and rectifier cut-off means, said storing means and said cut-off means conditioning said impulse to have a wave form with high initial energy, high power factor, and short overall duration; and means for connecting said source to the cell to apply said impulse thereto.

48. A mixture comprising cryolite having at least 1.5% dissolved aluminum therein, said mixture resulting from the process of initially activating molten cryolite and alumina by the application thereto of a finite series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, and subsequently mixing the activated cryolite with unactivated cryolite, whereby the activation diffuses into the mixture.

49. Apparatus for activating a melt of cryolite-alumina in order to increase the conductivity of an electrolytic cell when the melt is disposed therein comprising a circuit having a source for producing a finite series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, said source having means for storing the high energy; a firing electrode for applying said impulse to the melt; means for connecting said firing electrode to said source; and means for switching said source into circuit with said firing electrodes, the impedance of said circuit being conditioned to provide an excess of inductance therein; whereby the impulse is partially underdamped.

50. Apparatus for activating a Hall type melt in order to increase the conductivity of an electrolytic cell when the melt is disposed therein comprising a source for producing a series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, said source including means for storing the high energy, firing electrodes for discharging said impulse to the melt, a transformer for connecting said source to said firing electrodes, means for switching said source into circuit with said transformer, and resistance means connected to the primary portion of said transformer connected to said source, said resistance means being in the order of magnitude of the resistance between said firing electrodes when in circuit with the melt, said resistance being adjusted for the turns ratio of said transformer.

51. Apparatus for activating a melt of cryolite-alumina in order to increase the conductivity of an electrolytic cell when the melt is disposed therein comprising a source for producing a finite series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, firing electrodes for applying said impulse to the melt, a transformer for connecting said source to said firing electrodes, and means in circuit with said transformer for matching the impedance of load across said firing electrodes to the impedance of said source in order to improve the power factor of said impulse.

52. The process of increasing the ion concentration adjacent an electrode disposed in a melt of cryolite-alumina in order to increase the conductivity of an electrolytic cell when the melt is disposed therein comprising the step of applying a finite series of at least one impulse of high energy to the melt, said impulse having a peak voltage in the range of about 1000 to about 5000 volts, a peak voltage time duration in the range of about one to about ten microseconds, and a repetition rate in the range of about one to about twenty impulses within a period of about five seconds whereby ionic dissociation and crystal lattice breakdown is produced in the melt.

53. The process for providing an activated melt of cryolite-alumina to an electrolytic cell in order to increase the conductivity when the melt is disposed therein comprising the steps of activating the melt when the melt is without the electrolytic cell, said activating including applying a finite series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt.

54. The process for providing an activated melt of cryolite-alumina to an electrolytic cell in order to increase the conductivity when the melt is disposed therein comprising the steps of activating the melt when the melt is without the electrolytic cell, said activating including applying a finite series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt; delivering the activated melt to the electrolytic cell; and maintaining the melt being delivered in a fused condition.

55. The process for providing an activated melt of cryolite-alumina to an electrolytic cell in order to increase the conductivity when the melt is disposed therein comprising the steps of activating the melt when the melt is without the electrolytic cell, said activating including applying a finite series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt; delivering at least a portion of the activated melt to the electrolytic cell; and returning at least a portion of the melt from the cell for reactivation with the melt being activated.

56. The process for providing an activated melt of cryolite-alumina to an electrolytic cell in order to increase the conductivity when the melt is disposed therein comprising the steps of activating the melt when the melt is without the electrolytic cell, said activating including applying a finite series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt; delivering at least a portion of the activated melt to the electrolytic cell; returning at least a portion of the melt from the cell for reactivation with the melt being activated; and maintaining the melt being delivered and returned in a fused condition.

57. Apparatus for providing an activated melt of cryolite-alumina to an electrolytic cell in order to increase the yield of metal per kilowatt-hour of the cell when the activated melt is disposed therein comprising a vessel for containing the cryolite-alumina to be activated, a source for producing a series of at least one impulse of high energy adapted to be connected in circuit to the melt in said vessel, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, and means for transferring the cryolite-alumina between said vessel and the electrolytic cell.

58. Apparatus for providing an activated electrolyte of cryolite-alumina to an electrolytic cell in order to increase the conductivity of the cell when the activated electrolyte is disposed therein comprising a vessel for receiving the electrolyte to be activated, a source for producing a finite series of at least one impulse of high energy adapted to be connected to the electrolyte in said vessel, said impulse having a peak voltage in a range extending from a peak voltage at least equal to the minimum voltage required to produce an increase in the transfer capability of the electrolyte which persists at least in part after the applying of said impulse to a peak voltage less than the minimum voltage required to produce dielectric breakdown of the electrolyte, and means for recirculating the activated electrolyte from said vessel to the electrolytic cell and the electrolyte from the cell to said vessel, whereby the activation of the electrolyte within the cell can be maintained.

59. The process of activating a melt of a fused salt in order to increase the yield of metal per kilowatt-hour for a given rate of production of an electrolytic cell for the electrowinning of aluminum when the activated melt is electrolyzed in the cell comprising the step of discharging into the melt at least one high energy electrical impulse, the voltage drop of the impulse at the region of its discharge into the melt for at least part of the duration of the discharge being above the threshold minimum required to produce activation.

60. The process of durably activating a melt of a fused salt in order to increase the yield of metal per kilowatt-hour for a given rate of production of an electrolytic cell for the electrowinning of aluminum when the activated melt is electrolyzed in the cell comprising the step of discharging into the melt at least one electrical impulse of high peak current, the voltage drop of the impulse at the region of its discharge into the melt for at least part of the duration of the discharge being above the threshold minimum required to produce activation, the increase persisting appreciably beyond the termination of the discharge.

61. The process of durably activating a melt of a fused salt in order to increase the yield of metal per kilowatt-hour for a given rate of production of an electrolytic cell for the electrowinning of aluminum when the activated melt is electrolyzed in the cell comprising the step of discharging into the melt at least one electrical impulse of high peak current, the voltage drop of the impulse at the region of its discharge into the melt for at least part of the duration of the discharge being above the threshold minimum required to produce activation, the increase persisting appreciably beyond the termination of the discharge, the maximum voltage region and its duration in the discharge being less than sufficient to cause dielectric breakdown of the melt with the consequent loss of the impulse, and after a period of time discharging into the melt at least one electrical impulse of high peak current to maintain, enhance, or restore activation to the melt.

62. The process of durably activating a melt of a fused salt in order to increase the yield of metal per kilowatt-hour for a given rate of production of an electrolytic cell for the electrowinning of aluminum when the melt is being electrolyzed comprising the step of discharging into the melt at least one electrical impulse of high peak current in order to produce an increase in said yield which persists appreciably beyond the termination of the discharge, the combined parameters of impulse voltage in the region of its discharge, impulse duration, impulse energy, and rate of impulse repetition being cumulatively above the threshold minimum required to produce activation and less than the level sufficient to prevent activation or to cause substantial destruction of the activation.

63. The process of durably activating a melt of a fused salt in order to increase the power efficiency of an electrolytic cell for the electrowinning of aluminum when the melt is electrolyzed in the cell comprising the step of discharging into the melt at least one fast rise, high power factor, underdamped electrical impulse which is supplied from a source of stored energy and which is delivered to the region of discharge into the melt, the voltage drop across the discharge zone in the melt rising above the threshold minimum required to produce activation of the melt.

64. The process of activating a melt containing cryolite and at least 3% alumina in order to increase the power efficiency of an electrolytic cell in which the melt is disposed comprising the step of applying at least one finite series of at least one underdamped impulse of high current to the melt, said impulse having at least a portion in any one direction with a time duration in the range from about one microsecond to about twenty-five microseconds with a voltage at the discharge zone during said time range of at least about 1000 volts to about 5000 volts prior to any reversal of said impulse.

65. The process of improving the yield per unit of electrical power in the fused salt electrolytic winning of aluminum in a Hall type cell comprising the step of applying an infrequent discharge into the melt of one or a series of high energy electrical impulses, the combination of voltage, rise time, duration, repetition rate, current and power factor of the impulse being in a mutual relationship determined by the size, geometry and construction of the pot, the voltage, power factor and rise time each being in a critical range, the voltage being limited by activation threshold and dielectric breakdown, the power factor being high but less than unity and the rise time being rapid so that concentration gradient is produced which results in a chain reaction, whereby the concentration gradient develops and starts nucleation toward an activated condition in the melt so that the electrolytic cell functions with greater yield of metal at a given rate for the electrolyzing power input and the additional activity is maintained for many orders of magnitude longer than the usual relaxation time for ionic increases, the extent and duration of the enhanced activity depending upon the closeness to the optimums of mutual relationship in the parameters of the excitation discharge and the nature of the firing electrodes, the distance and nature of the pot walls, the nature and condition of the melt, and the nature and condition of the electrolyzing electrodes.

66. The process of increasing the ion concentration adjacent an electrode disposed in a melt of a fused salt solution of alumina comprising the step of applying high energy impulses, said impulses having a peak voltage in the discharge zone, and a time duration of about one to about ten microseconds in said voltage range, the repetition of the impulses being in the range of about two per second to about one per fifteen minutes, said increase persisting between impulses.

67. The process of activating material to be employed in a Hall type cell for the production of aluminum, the material after being activated being adapted to increase the yield of metal per kilowatt-hour for a given rate of production, said process comprising the step of combining together previously activated material and the material to be activated, the previously activated material having been activated by discharging into a melt thereof at least one high energy electrical impulse, the voltage drop of the impulse at the region of its discharge into the melt for at least a part of the duration of the discharge being above the threshold minimum required to produce activation whereby the combined material becomes activated.

68. The process of activating a melt containing alumina and at least one halide salt in order to increase the conductivity of an electrolytic cell when the melt is disposed therein comprising the step of applying a finite series of at least one high energy impulse to the melt by means of an electrode disposed adjacent thereto, said impulse having a rise time of less than about two microseconds, a voltage in the range of about 900 to 5000 volts at the firing electrode for a duration within said voltage of at least three microseconds, and a current density in the range of about 8000 to about 100,000 amperes per square inch of the electrode at which the impulse is applied.

69. Apparatus for activating a fused salt melt containing alumina for the electrolytic reduction thereof in order to increase the yield of metal for a given rate comprising a source for producing at least one high energy impulse within the melt, at least one firing electrode, a circuit for connecting said source to said electrode, said circuit having a combination of inductance and resistance enabling an underdamped impulse to be delivered rapidly and with a high power factor to the electrode so that the impulse attains a voltage level and a current level sufficiently in phase with said voltage to activate the melt for a persisting period, and means for controlling said source to produce required number of said impulses to be applied by said electrode to said melt in accordance with a desired activation pattern, the voltage of the source being sufficient to provide for the voltage drop of said circuit and for the voltage drop in the melt.

70. Apparatus for activating a Hall type melt in order to increase the conductivity of an electrolytic cell having an electrolyzing anode when the melt is disposed therein comprising a source for producing a finite series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, and at least one firing electrode for applying said impulse to the melt, the total firing electrode discharge area in the range of about .2% to about 10% of the total electrolyzing anode area of the cell.

71. Apparatus in accordance with claim 70 in which said firing electrode is an oxidizable metal material.

72. Apparatus in accordance with claim 71 in which said oxidizable metal material is selected from the group consisting of nickel, tungsten, and chromium.

73. Apparatus in accordance with claim 70 in which said firing electrode is formed substantially of amorphous carbon material.

74. The process of activating a melt of a fused salt in order to increase the yield of metal per kilowatt-hour for a given rate of production of an electrolytic cell for the electrowinning of aluminum when the activated melt is electrolyzed in the cell comprising the step of discharging into the melt from an electrode at least one high energy electrical impulse, the peak wattage of said impulse being at least of the order of one megawatt per square inch of the area of the electrode from which the impulse is discharged.

75. The process of activating an electrolyte containing alumina in order to increase the yield of metal per kilowatt-hour for a given rate of production of an electrolytic cell when the electrolyte is electrolyzed therein comprising the step of applying a series of at least one impulse of high energy to the melt, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, the minimum time duration of said peak voltage being in the range of about one microsecond to about 25 microseconds.

76. The process of activating an electrolyte containing alumina in order to increase the yield of metal per kilowatt-hour for a given rate of production of an electrolytic cell when the electrolyte is disposed therein, the cell having an electrolyzing anode structure, at least one firing electrode disposed in the cell, the total firing electrode area being smaller than that of the total electrolyzing anode structure, comprising the step of applying a series of at least one impulse of high energy to the melt by means of the firing electrode, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt.

77. Apparatus for activating a Hall type melt for the production of aluminum in order to durably increase the conductivity of the melt comprising at least one source for producing a series of at least one high energy impulse, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, and an electrode for firing said impulse into the melt, said electrode being divided into segments spaced adjacent to and insulated from each other, said segments being connected to said source, whereby the resistance to inductance ratio is increased.

78. The process of operating a fused salt electrolytic cell containing a melt for the reduction of alumina, the melt of said cell having been activated by the discharging into the melt at least one high energy electrical impulse, the voltage drop of the impulse at the region in its discharge into the melt for at least a part of the duration of the discharge being above the threshold minimum required to produce activation, comprising the step of subjecting the activated melt to an electrolyzing anode current density in excess of about five amperes per square inch of carbon anode surface at an electrolyzing voltage in the range of about 2 to about 3 volts.

79. The composition of cryolite activated by discharging into the melt of cryolite at least one high energy electrical impulse the voltage drop of the impulse at the region of its discharge into the melt for at least a part of the duration of the discharge being above the threshold minimum required to produce activation, comprising cryolite having aluminum atoms dissolved therein to an extent which is materially in excess of the normal solubility of aluminum atoms in cryolite of the type used in a Hall type cell, whereby the transfer efficiency in the electrowinning of aluminum is enhanced for a melt in which said activated cryolite is included.

80. The process of electrowinning aluminum comprising the steps of activating the electrolyte by means of applying thereto a predetermined finite series of high energy impulses, said impulses having a peak voltage in the range of about 1000 to about 5000 volts at the discharge zone of the electrolyte, and subsequently applying a low voltage electrolyzing current to the electrolyte.

81. The process of restoring a melt of activated electrolyte contained in an electrolytic cell for the production of aluminum to its activated electrolyzing condition during a condition of anode effect occurring subsequently to its activation by discharging into the melt at least one high energy electrical impulse, the voltage drop of the impulse at the region of its discharge into the melt for at least a part of the duration of the discharge being above the threshold minimum required to produce activation, comprising the step of adding aluminum oxide material to the melt in the cell during the condition of anode effect, the material being added being sufficient to change the cell from anode effect to normal reduction, wherey the addition of aluminum oxide material restores the cell to active operating condition without the application of additional impulses.

82. The process of activating a melt containing alumina dissolved in halide salts in order to increase the conductivity of an electrolytic cell when the melt is disposed therein comprising the step of building up a high energy concentration gradient in at least a portion of the melt by discharging at least one high energy electrical impulse, the voltage drop of the impulse at the region of its discharge into the melt for at least a part of the duration of the discharge being above the threshold minimum required to produce activation, whereafter said concentration gradient diffuses into the melt and produces a lasting decrease in the voltage required for the electrolyzation at a given production rate.

83. Apparatus for activating a melt of cryolite-alumina in order to increase the conductivity of an electrolytic cell when the melt is disposed therein comprising a source for producing a finite series of at least one impulse of high energy, said impulse having a peak voltage in a range extending from a peak voltage at least equal to the minimum voltage required to produce an increase in the conductivity of the cell which persists at least in part after the applying of said impulse to a peak voltage less than the minimum voltage required to produce dielectric breakdown of the melt, said source including capacitance means for storing the high energy, saturable transformer means for connecting said source to the melt to apply said impulse thereto whereby said capacitance means and said transformer means shape said impulse to have a damped wave form with high initial energy and limited overall energy, and means for connecting said source to the melt to apply said impulse thereto.

References Cited by the Examiner

UNITED STATES PATENTS 2,939,824  7/1957  Greenfield _____ 204—67

FOREIGN PATENTS 123,234  1/1947  Australia.

JOHN H. MACK, *Primary Examiner.*

H. S. WILLIAMS, *Examiner.*